United States Patent
De Backer et al.

(10) Patent No.: US 11,697,244 B2
(45) Date of Patent: Jul. 11, 2023

(54) IN-LINE POLYMERIZATION FOR CUSTOMIZABLE COMPOSITE FIBER MANUFACTURE IN ADDITIVE MANUFACTURING

(71) Applicant: UNIVERSITY OF SOUTH CAROLINA, Columbia, SC (US)

(72) Inventors: Wout De Backer, Columbia, SC (US); Valerie Kay, Summerfield, NC (US); Michael Van Tooren, Elgin, SC (US)

(73) Assignee: University of South Carolina, Columbia, SC (US)

( * ) Notice: Subject to any disclaimer, the term of this patent is extended or adjusted under 35 U.S.C. 154(b) by 70 days.

(21) Appl. No.: 17/459,294

(22) Filed: Aug. 27, 2021

(65) Prior Publication Data

US 2022/0063190 A1     Mar. 3, 2022

Related U.S. Application Data

(60) Provisional application No. 63/071,642, filed on Aug. 28, 2020.

(51) Int. Cl.
  *B29C 64/165*      (2017.01)
  *B33Y 80/00*       (2015.01)
  (Continued)

(52) U.S. Cl.
  CPC .......... *B29C 64/165* (2017.08); *B29C 64/227* (2017.08); *B29C 64/245* (2017.08);
  (Continued)

(58) Field of Classification Search
  CPC ....... B29C 70/16; B29C 70/20; B29C 70/202; B29C 70/205; B29C 70/207; B29C 70/384
  See application file for complete search history.

(56) References Cited

U.S. PATENT DOCUMENTS 3,728,146 A * 4/1973 Marzocchi .............. C03C 25/27
                                                 428/494
3,765,927 A * 10/1973 Marzocchi ................. C08J 5/08
                                                 427/412
(Continued)

FOREIGN PATENT DOCUMENTS

CN          204431743              7/2015
CN          108407300 A   *        8/2018
(Continued)

OTHER PUBLICATIONS

5AxisWorks. "5AxisMaker" (2017).
(Continued)

*Primary Examiner* — Atul P. Khare
(74) *Attorney, Agent, or Firm* — Dority & Manning, P.A.

(57) ABSTRACT

A composite fiber for use in additive manufacturing such as fused filament fabrication is described along with methods of its construction and use. The composite fiber includes a single continuous fiber (e.g., a continuous carbon roving) and a polymer (e.g., a high glass transition polymer) in intimate contact. The composite fiber is formed through immersion of the continuous fiber in a series of two or more solutions that together include monomer(s), catalysts, or other materials for generating the polymer as the continuous fiber moves through the solutions.

23 Claims, 7 Drawing Sheets

(51) Int. Cl.
  *B33Y 10/00*  (2015.01)
  *B33Y 70/10*  (2020.01)
  *B29C 64/295*  (2017.01)
  *B29C 64/227*  (2017.01)
  *B29C 64/321*  (2017.01)
  *B29C 64/245*  (2017.01)
  *B29C 70/38*  (2006.01)
  *B29C 70/20*  (2006.01)
  *B29K 77/00*  (2006.01)
  *B29K 79/00*  (2006.01)
  *B29K 73/00*  (2006.01)

(52) U.S. Cl.
  CPC .......... *B29C 64/295* (2017.08); *B29C 64/321* (2017.08); *B29C 70/205* (2013.01); *B29C 70/38* (2013.01); *B33Y 10/00* (2014.12); *B33Y 70/10* (2020.01); *B33Y 80/00* (2014.12); *B29K 2073/00* (2013.01); *B29K 2077/00* (2013.01); *B29K 2079/00* (2013.01)

(56) References Cited

U.S. PATENT DOCUMENTS

| | | | | |
|---|---|---|---|---|
| 3,816,235 | A * | 6/1974 | Lin | C03C 25/27 524/265 |
| 4,737,527 | A * | 4/1988 | Maranci | C08K 9/08 525/122 |
| 4,898,527 | A | 2/1990 | Claassen et al. | |
| 5,936,861 | A | 8/1999 | Jang et al. | |
| 6,113,696 | A | 9/2000 | Tseng et al. | |
| 6,907,307 | B2 | 6/2005 | Chen et al. | |
| 6,942,830 | B2 | 9/2005 | Mülhaupt et al. | |
| 7,122,246 | B2 | 10/2006 | Comb et al. | |
| 8,226,395 | B2 | 7/2012 | Pax et al. | |
| 8,778,252 | B2 | 7/2014 | Mackie et al. | |
| 9,211,674 | B2 | 12/2015 | Van Tooren et al. | |
| 9,527,272 | B2 | 12/2016 | Steele | |
| 9,539,762 | B2 | 1/2017 | Durand et al. | |
| 9,745,452 | B2 | 8/2017 | Hwang et al. | |
| 10,814,607 | B2 | 10/2020 | Van Tooren et al. | |
| 11,192,297 | B2 * | 12/2021 | Van Tooren | B29C 64/314 |
| 11,565,442 | B2 * | 1/2023 | Meyer | D06B 23/023 |
| 2008/0042321 | A1 | 2/2008 | Russell et al. | |
| 2009/0014919 | A1 | 1/2009 | Rossfeldt et al. | |
| 2009/0273122 | A1 | 11/2009 | Batchelder et al. | |
| 2010/0237531 | A1 | 9/2010 | Lyons et al. | |
| 2010/0291304 | A1 | 11/2010 | Becker | |
| 2014/0023812 | A1 | 1/2014 | Hammer et al. | |
| 2014/0291886 | A1 | 10/2014 | Mark et al. | |
| 2014/0328963 | A1 | 11/2014 | Mark et al. | |
| 2014/0328964 | A1 | 11/2014 | Mark et al. | |
| 2015/0108677 | A1 | 4/2015 | Mark et al. | |
| 2015/0165666 | A1 | 6/2015 | Butcher et al. | |
| 2015/0210007 | A1 | 7/2015 | Durand et al. | |
| 2015/0251360 | A1 | 9/2015 | Steele | |
| 2015/0290875 | A1 | 10/2015 | Mark et al. | |
| 2015/0314531 | A1 | 11/2015 | Mark et al. | |
| 2015/0375457 | A1 | 12/2015 | Mark et al. | |
| 2016/0009030 | A1 | 1/2016 | Mark et al. | |
| 2016/0046082 | A1 | 2/2016 | Fuerstenberg | |
| 2016/0177078 | A1 | 6/2016 | Naito et al. | |
| 2017/0028639 | A1 | 2/2017 | Evans et al. | |
| 2017/0028644 | A1 | 2/2017 | Evans et al. | |
| 2017/0044337 | A1 | 2/2017 | Van Tooren et al. | |
| 2017/0057167 | A1 | 3/2017 | Van Tooren et al. | |
| 2017/0106565 | A1 | 4/2017 | Braley et al. | |
| 2017/0136707 | A1 | 5/2017 | Batchelder et al. | |
| 2017/0355142 | A1 | 12/2017 | Sterman et al. | |
| 2018/0063895 | A1 | 3/2018 | Van Tooren et al. | |
| 2018/0356118 | A1 | 12/2018 | Van Tooren et al. | |
| 2018/0370129 | A1 * | 12/2018 | Natale | B29C 64/209 |
| 2021/0023774 | A1 | 1/2021 | Van Tooren et al. | |
| 2022/0143913 | A1 * | 5/2022 | De Backer | D06M 10/02 |

FOREIGN PATENT DOCUMENTS

| | | | |
|---|---|---|---|
| DE | 10049473 | 5/2001 | |
| GB | 2333737 A * | 8/1999 | ............... B29B 9/14 |
| JP | S 56161259 | 12/1981 | |
| KR | 2018/0040555 | 4/2018 | |
| KR | 2018/0055425 | 5/2018 | |
| WO | WO 2014/153535 | 9/2014 | |
| WO | WO 2015/073322 | 5/2015 | |
| WO | WO 2015/077262 | 5/2015 | |
| WO | WO 2015/112998 | 7/2015 | |
| WO | WO-2022018199 A1 * | 1/2022 | |

OTHER PUBLICATIONS

Achillas et al. "A methodological framework for the inclusion of modern additive manufacturing into the production portfolio of a focused factory" *J. Manuf. Syst.* 37 (2015) pp. 328-339.
Agassant et al. "Polymer processing extrusion instabilities and methods for their elimination or minimization" *Int'l Polym. Proc.* 21 (2006) pp. 239-255.
Ageorges et al. "Fusion Bonding of Polymer Composites" *Springer* (2002) pp. 1-284.
Ahn et al. "Anisotropic material properties of fused deposition modeling ABS" *Rapid Prototyp. J.* 8 (2002) pp. 248-257.
Alexander et al. "Part orientation and build cost determination in layered manufacturing" *Comp.-Aided Des.* 30 (1998) pp. 343-356.
Alhaidri, M.A. "Characterization of carbon-fiber reinforced polyetherimide thermoplastic composites using mechanical and ultrasonic methods" *U. Wisc.-Milw.* (2014) pp. 1-84.
American Machinist. "The CAD/CAM hall of fame" (1998) pp. 1-3.
Antonov et al. "Anisoprint: Revolutionary 3D printing technology" (2016) pp. 1-3.
Arevo Labs. "Robotic Additive Manufacturing Platform—RAMP" (2015) pp. 1-2.
ASTM. "D3518—Standard test method for in-plane shear response of polymer matrix composite materials by tensile test of a ±45° laminate" *ASTM Int'l* (2018) pp. 1-7.
Autodesk. "Inventor Professional 3D CAD Software" (2017) p. 1.
Beckhoff. "TwinCAT—PLC and Motion Control on the PC" Beckhoff Automation Technology 3 (2016) pp. 1-2.
Bellini et al. "Mechanical characterization of parts fabricated using fused deposition modeling" *Rapid Prototyp. J.* 9 (2003) pp. 252-264.
Botelho et al., "Study of polyamide 6/6 synthesis carried out by interfacial polymerization on carbon fibre" *Polym. Int'l* 51 (2002) pp. 1261-1267.
Burtovyy et al. "Hydrophobic modification of polymer surfaces via "grafting to" approach." *J. Macromol. Sci. B* 46 (2007) pp. 137-154.
Byun et al. "Determination of the optimal build direction for different rapid prototyping processes using multi-criterion decision making" *Robot. Comp.-Integr. Manufac.* 22 (2006) pp. 69-80.
Canellidis et al. "Efficient parts nesting schemes for improving stereolithography utilization" *Comp.-Aided Des.* 45 (2013) pp. 875-886.
Chacón et al. "Integration of topology optimized designs into CAD/CAM via an IGES translator" *Struct. Multidisc. Optim.* 50 (2014) pp. 1115-1125.
Chakraborty et al. "Extruder path generation for curved layer fused deposition modeling" *Comp.-Aided Des.* 40 (2008) pp. 235-243.
Cheng et al. "Multi-objective optimization of part-building orientation in stereolithography" *Rapid Prototyp. J.* 1 (1995) pp. 12-23.
Choi et al. "A versatile virtual prototyping system for rapid product development" *Comp. Indus.* 59 (2008) pp. 477-488.
Choi et al. "A multi-material virtual prototyping system" *Comp.-Aided Des.* 37 (2004) pp. 123-136.
Choi et al. "A virtual prototyping system for rapid product development" *Comp.-Aided Des.* 36 (2003) pp. 401-412.
Choset et al. "Principles of robot motion: theory, algorithms, and implementation" *MIT Press* (2005) pp. 1-616.
Cicala et al. "Engineering thermoplastics for additive manufacturing: a critical perspective with experimental evidence to support functional applications" *J. Appl. Biomater. Funct. Mater.* 15 (2017) pp. e10-e18.

(56) References Cited

OTHER PUBLICATIONS

Coetzee, G. "Filament thickness sensors: What are they and what are they good for?" *Hackaday* (2016) pp. 1-3.
Conner et al. "Making sense of 3d printing: Creating a map of additive manufacturing products and services" *Add. Manufact.* 1 (2014) pp. 64-76.
Creative Innovation Ltd. "Engineering Plastics" *Innovation Group* (2017) pp. 1-2.
Cupar et al. "Shape verification of fused deposition modelling 3D prints" *Int'l J. Info. Comp. Sci.* 4 (2015) pp. 1-8.
Dassault Systemés. "Catia" V5-6R2014 (2017) p. 1.
Dassault Systemés. "Solidworks®" (2017) p. 1.
De Backer et al. "Automated reconstruction of continuous robotic motion from G-code patterns" *Proc. CAD* (2016) pp. 316-321.
Dealy et al. "Melt rheology and its applications in the plastics industry" *Springer* (2013) pp. 1-292.
Ding et al. "Ch. 1—Advanced design for additive manufacturing: 3D slicing and 2D path planning" *New Trends in 3D Printing* (2016) pp. 3-23.
Ding et al. "A practical path planning methodology for wire and arc additive manufacturing of thin-walled structures" *Robot. Comp.-Integr. Manufact.* 34 (2015) pp. 8-19.
Doherty et al. "Selective directional reinforcement of structures for multi-axis additive manufacturing" *CAMX Conf. Proc.* (2016) pp. 1-14.
Dolenc et al. "Slicing procedure for layered manufacturing techniques" *Comp.-Aided Des.* 26 (1994) pp. 119-126.
Donald et al. "Kinodynamic motion planning" *J. Assoc. Comp. Mach.* 40 (1993) pp. 1048-1066.
Draper et al. "Mixed Polymer Brushes by Sequential Polymer Addition: Anchoring Layer Effect" *Langmuir* 20 (2004) pp. 4064-4075.
E3D-Online. "E3D V6 Hot End" (2017) pp. 1-2.
E-CFR. "Title 14—Aeronautics and Space" *Office of Federal Register* (2017) pp. 1-1399. https://ecfr.io/Title-14/ (Web only).
Edie et al. "Thermoplastic coating of carbon fibers" *Clemson U.* NASA-CR-185047 (1989) pp. 1-136.
El-Dessouky et al. "Ultra-lightweight carbon fibre/thermoplastic composite material using spread tow technology" *Composites Part B: Eng.* 50 (2013) pp. 91-97.
El-Gizawy et al. "Process-induced properties of FDM products" *Proc. ICMET* (2011) pp. 25-29.
Filastruder. "Filastruder Kit and Filawinder Kit" (2017) pp. 1-3.
Fitter et al. "A review on approaches for handling Bézier curves in CAD for manufacturing" *Procedia Eng.* 97 (2014) pp. 1155-1166.
Frank et al. "Expert system-based selection of the preferred direction of build for rapid prototyping processes" *J. Intell. Manufact.* 6 (1995) pp. 339-345.
Gao et al. "The status, challenges, and future of additive manufacturing in engineering" *Comp.-Aided Des.* 69 (2015) pp. 65-89.
Gardner et al. "High temperature thermoplastic additive manufacturing using low-cost, open-source hardware" *NASA Langley Res. Ctr.* NASA/TM-2016-219344 (2016) pp. 1-15.
GE Plastics. "Ultem® PEI Resin Product Guide" *GE Eng. Thermoplastics* (2015) pp. 1-52.
Geraerts et al. "A comparative study of probabilistic roadmap planners" *Algor. Found. Robotics V* (2004) pp. 43-58.
Gibson et al. "Ch. 8: Sheet Lamination Processes" *Additive Manufacturing Technologies* (2010) Springer pp. 223-252.
Giles et al. "Extrusion: The definitive processing guide and handbook" *William Andrew, Inc.* (2004) pp. 1-560.
Giraud et al. "Preparation of aqueous dispersion of thermoplastic sizing agent for carbon fiber by emulsion/solvent evaporation" *Appl. Surf. Sci.* 266 (2013) pp. 94-99.
Grutle, Ø.K. "5-axis 3D Printer" *U. Oslo* (2015) pp. 1-114.
Guo, B. "Surface reconstruction: From points to splines" *Comp.-Aided Des.* 9 (1997) pp. 269-277.
Hart et al. "A formal basis for the heuristic determination of minimum cost paths" *IEEE Trans. Sys. Sci. Cyber.* ssc-4 (1968) pp. 100-107.

Hayes et al. "Optical microscopy of fiber-reinforced composites" 05303G *ASM Int'l.* (2010) pp. 1-9.
Henton et al. "Ch. 16—Polylactic Acid Technology" *Nat. Fibers Biopolym. Biocomp.* (2005) pp. 527-577.
Hexcel. "Hextow® AS4 Carbon Fiber Datasheet" *Hexcel Corp.* (2018) pp. 1-2.
Hopmann et al. "Extrusion dies for plastics and rubber: Design and engineering computations" *Hanser Verlag* (2016) pp. 1-451.
Hou et al. "Manufacture of a carbon-fabric-reinforced polyetherimide (CF/PEI) composite material" *Comp. Sci. Techn.* 58 (1998) pp. 181-190.
Huang et al. "Evolutionary Topology Optimization for Continuum Structures: Methods and Applications" *John Wiley & Sons, Ltd.* (2010) pp. 121-150.
Impossible Objects. "Composite-Based Additive Manufacturing (CBAM) Technology" *Imposs. Obj.* (2017).
Invernizzi et al. "UV-assisted 3D printing of glass and carbon fiber-reinforced dual-cure polymer composites" *Materials* 9:583 (2016) pp. 1-12.
ISO. "Prosthetics—Structural Testing of lower-limb prostheses, requirements and test methods" *Int'l Org. Stand.* ISO 10320:2016 (2016) pp. 1-140. (Preview only).
Iyer et al. "Polystyrene Layers Grafted to Macromolecular Anchoring Layer" *Macromolecules* 36 (2003) pp. 6519-6526.
Jamieson et al. "Direct slicing of CAD models for rapid prototyping" *Rapid Prototyp. J.* 1 (1995) pp. 4-12.
Jia et al. "Research on the melt impregnation of continuous carbon fiber reinforced nylon 66 composites" *IOP Conf. Ser.: Mater. Sci. Eng.* 137:012053 (2016) pp. 1-14.
Kassapoglou, C. "Design and Analysis of Composite Structures with Application to Aerospace Structures" *Aerospace Series* (2010) pp. 1-307.
Kavraki et al. "Probabilistic roadmaps for path planning in high-dimensional configuration spaces" *IEEE Trans. Robot. Autom.* 12 (1996) pp. 566-580.
Kerbrat et al. "Manufacturability analysis to combine additive and subtractive processes" *Rapid Prototyp. J.* 16 (2010) pp. 63-72.
Kim et al. "Tool path generation for clean-up machining by a curve-based approach" *Comp.-Aided Des.* 37 (2005) pp. 967-973.
Koc et al. "Adaptive ruled layers approximation of STL models and multi-axis machining applications of rapid prototyping" *J. Manuf. Sys.* 21 (2003) pp. 153-166.
Kruth et al. "Progress in additive manufacturing and rapid prototyping" *Ann. CIRP* 47 (1998) pp. 525-540.
KUKA AG. "Industrial Robotics_Small Robots" *KUKA Robotics Corporation* (2018).
KUKA AG. "Kuka.OfficeLite" *KUKA Robotics Corporation* (2017).
KUKA AG. "Roboter GmbH Controller: KR AGILUS six with W and C Variants Specification" *KUKA Robotics Corporation* (2015) pp. 1-133.
KUKA AG. "Roboter GmbH Controller: KR C4 Operating Instructions" *KUKA Robotics Corporation* (2012) pp. 1-183.
KUKA AG. "Kuka.Sim" *KUKA Robotics Corporation* Ver. 2.2 (2016).
KUKA AG. "Kuka.WorkVisual." *KUKA Robotics Corporation* Ver. 3.2-4.1 (2014).
Kulkarni et al. "A review of process planning techniques in layered manufacturing" *Rapid Prototyp. J.* 6 (2000) pp. 18-35.
Kulkarni et al. "Deposition strategies and resulting part stiffnesses in fused deposition modeling" *J. Manuf. Sci. Eng.* 121 (1999) pp. 93-103.
Kulkarni et al. "An accurate slicing procedure for layered manufacturing" *Comp.-Aided Des.* 28 (1996) pp. 683-697.
Kumar et al. "Representation and processing of heterogeneous objects for solid freeform fabrication" *Geom. Model. Worksh.* WG5.2 (1998) pp. 1-21.
Lampton, M. "Rotation Sequences and Euler Angles" (1993) pp. 1-7.
Lange et al. "Analysis of surface roughness using confocal microscopy" *J. Mater. Sci.* 28(14) (1993) pp. 3879-3884.
Lavalle et al. "Rapidly-exploring random trees: Progress and prospects" *Algor. Comp. Rob.* (2000) pp. 303-307.

(56) References Cited

OTHER PUBLICATIONS

Lehong et al. "Hype Cycle for Emerging Technologies, 2012" *Gartner* (2012) pp. 1-2.
Li et al. "Fabrication of paper-based microfluidic sensors by printing" *Coll. Surf. B* 76 (2010) pp. 564-570.
Lin et al. "Automatic generation of NC cutter path from massive data points" *Comp.-Aided Des.* 30(1) (1998) pp. 77-90.
Liu et al. "An approximation method to circular arcs" *Appl. Math. Comp.* 219 (2012) pp. 1306-1311.
Liu et al. "Synthesis of High-Density Grafted Polymer Layers with Thickness and Grafting Density Gradients" *Langmuir* 21 (2005) pp. 11806-11813.
Liu et al. "Polymer Grafting via ATRP Initiated from Macroinitiator Synthesized on Surface" *Langmuir* 20 (2004) pp. 6710-6718.
Local Motors. "Local Motors Strati 3D Printed Car" *Int'l Manuf. Techn. Show* (2014).
Luzinov et al. "Responsive brush layers: from tailored gradients to reversibly assembled nanoparticles" *Soft Matt.* 4 (2008) pp. 714-725.
Luzinov. I., "Nanofabrication of thin polymer films" *Nanofibers and Nanotechnology in Textiles* Woodhead Publishing Ltd. (2007) pp. 448-469.
Ma et al. "NURBS-based adaptive slicing for efficient rapid prototyping" *Comp.-Aided Des.* 36 (2004) pp. 1309-1325.
Maker's Tool Works. "MendelMax 3" *Maker's Tool Works, LLC* (2015).
Mangual et al. "Acoustic-Emission-Based Characterization of Corrosion Damage in Cracked Concrete with Prestressing Strand" *ACI Mater. J.* 110(1) (2013) pp. 89-98.
Manufacturing Institute. "Manufacturing's Multiplier Effect is Stronger than Other Sectors" (2014) p. 1.
MarkForged. "Mark Two Desktop 3D Printer" *MarkForged* (2015) pp. 1-2.
Martínez et al. "Comparative between FEM models for FDM parts and their approach to a real mechanical behavior" *Procedia Eng.* 63 (2013) pp. 878-884.
Masood et al. "A generic algorithm for a best part orientation system for complex parts in rapid prototyping" *J. Mater. Proc. Techn.* 139- (2003) pp. 110-116.
Mastercam. "Mastercam for Solidworks® Solutions" *CNC Software, Inc.* (2017) p. 1.
Materialise. "Materialise Magics" (2017) pp. 1-3.
Matsuzaki et al. "Three-dimensional printing of continuous-fiber composites by in-nozzle impregnation" *Sci. Rep.* 6:23058 (2016) pp. 1-7.
Matweb, LLC. *Database of Material Property Data* http://www.matweb.com (Web only).
Miaris et al. "Continuous impregnation of carbon-fibre rovings" *JEC Comp.* 56 (2010) pp. 75-76.
Michaeli et al. "Extrusion dies for plastics and rubber: Design and engineering computations" *Hanser Verlag* (2003) pp. 1-362.
Molitch-Hou, M. "A new spin on 3D printing weaves objects without supports" engineering.com (2016) pp. 1-3.
Mori et al. "Dieless forming of carbon fibre reinforced plastic parts using 3D printer" *Procedia Eng.* 81 (2014) pp. 1595-1600.
Moroni et al. "Functionality-based part orientation for additive manufacturing" *Procedia CIRP* 36 (2015) pp. 217-222.
Neacsu et al. "Spontaneous radial capillary impregnation across a bank of aligned micro-cylinders. Part I: Theory and model development" *Int'l J. Multiph. Flow* 32(6) (2006) pp. 661-676.
Neacsu et al. "Spontaneous radical capillary impregnation across a bank of aligned micro-cylinders. Part II: Experimental investigations" *Int'l J. Multiph. Flow* 32(6) (2006) pp. 677-691.
Nelaturi et al. "Representation and analysis of additively manufactured parts" *Comp.-Aided Des.* 67 (2015) pp. 13-23.
Ning et al. "Additive manufacturing of carbon fiber-reinforced plastic composites using fused deposition modeling: Effects of process parameters on tensile properties" *J. Comp. Mater.* 51(4) (2017) pp. 451-462.

Nohara et al. "Processing of high performance composites based on peek by aqueous suspension prepregging" *Mater. Res.* 13 (2010) pp. 245-252.
Novikov et al. "Mataerial: A radically new 3D printing method" (2017) p. 1.
Noztek. "Noztek xcalibur" (2018) pp. 1-14.
Offringa et al. "Butt-joined, Thermoplastic Stiffened-skin Concept Development" *SAMPE J.* 48 (2012) pp. 7-15.
Olhoff et al. "On CAD-integrated structural topology and design optimization" *Comp. Meth. Appl. Mech. Eng.* 89 (1991) pp. 259-279.
Owen-Hill, A. "What's the Difference Between Offline Programming and Simulation?" *RoboDK Simulation and OLP for Robots* (2017) pp. 1-5.
Padhye et al. "Multi-objective optimisation and multi-criteria decision making in SLS using evolutionary approaches" *Rapid Prototyp. J.* 17 (2011) pp. 458-478.
Pandey et al. "Real time adaptive slicing for fused deposition modeling" *Mach. Tools Manuf.* 43 (2003) pp. 61-71.
Park et al. "Tool path generation for a surface model with defects" *Comp. Indust.* 61 (2010) pp. 75-82.
Park et al. "Tool-path generation from measured data" *Comp.-Aided Des.* 35 (2003) pp. 467-475.
Pham et al. "Part orientation in stereolithography" *Int'l J. Adv. Manuf. Techn.* 15 (1999) pp. 674-682.
Pham et al. "A comparison of rapid prototyping technologies" *Int'l J. Mach. Tools Manuf.* 38 (1998) pp. 1257-1287.
Ponche et al. "Ch. 11: A new global approach to design for additive manufacturing" *Additive Manuf. Handbook* (2012) pp. 170-186.
Popescu et al. "Direct tool-path generation based on graph theory for milling roughing" *Procedia CIRP* 25 (2014) pp. 75-80.
Python Software Foundation. "Python 2.7" https://www.python.org (Web only).
Ramachandran et al. "Mayavi: 3D Visualization of Scientific Data" *IEEE Comp. Sci. Eng.* 13 (2011) pp. 40-51.
Ren et al. "Clean-up tool path generation by contraction tool method for machining complex polyhedral models" *Comp. Ind.* 54 (2004) pp. 17-33.
Repetier. "BoXZY Rapid-Change FabLab Firmware" https://www.repetier.com (Web only).
Rieder et al. "Online monitoring of additive manufacturing processes using ultrasound" *Euro. Conf. Non-Destr. Test.* (2014) pp. 1-8.
Roboris. "Eureka Virtual Machining" https://www.roboris.it (Web only).
Rosen, D.W. "Computer-aided design for additive manufacturing of cellular structures" *Comp-Aided Des. Appl.* 4 (2013) pp. 585-594.
Russell et al. "American makes: The National Additive Manufacturing Innovation Institute (NAMII) Status Report and Future Opportunities" *SAMPE J.* 50 (2014) pp. 62-65.
SABIC. "ULEM™ Resin 1000" (2015) pp. 1-3.
SABIC. "ULEM™ Resin 9085" (2015) pp. 1-3.
Sánchez et al. "A single-query bi-directional probabilistic roadmap planner with lazy collision checking" *Robot. Res.* (2003) pp. 403-417.
Sellamani et al. "PCS: Prominent cross-sections for mesh models" *Comp.-Aided Des. Appl.* 7 (2010) pp. 1-20.
Shi et al. "Manufacturability analysis for additive manufacturing using a novel feature recognition technique" *Comp.-Aided Des. Appl.* 15 (2018) pp. 941-952.
Simplify3D. "Simplify3D 3D Printing Slicing Software" (2017) pp. 1-5.
Singamneni et al. "Modeling and evaluation of curved layer fused deposition" *J. Mater. Proc. Tech.* 212 (2012) pp. 27-35.
Singamneni et al. "Curved-layer fused deposition modelling" *J. New Gener. Sci.* 8 (2010) pp. 95-107.
Sinotech, Inc. *Injection molded parts, process and equipment.* https://www.sinotech.com (Web only).
Slic3r. "Slic3r g-code generator for 3D printers" http://www.slic3r.org (Web only).
Smith et al. "Structural characteristics of fused deposition modeling polycarbonate material" *Polym. Test.* 32 (2013) pp. 1306-1312.

(56) References Cited

OTHER PUBLICATIONS

Sobieszczanski-Sobieski et al. "Multidisciplinary aerospace design optimization: Survey on recent developments" *Struct. Optim.* 14 (1997) pp. 1-23.
Stentz, A. "Optimal and efficient path planning for partially-known environments" *Proc. IEEE Int'l Conf. Robot. Autom.* (1994) pp. 3310-3317.
Stevenson, K. "Can Enomoto's Experimental 5-Axis 3D Printer Hybrid Do the Impossible?" *Fabbaloo* (2016) pp. 1-2.
Stratasys. *3D printing and additive manufacturing.* http://www.stratasys.com (Web only).
Subrahmanyam et al. "An overview of automatic feature recognition techniques for computer-aided process planning" *Comp. Indust.* 26 (1995) pp. 1-21.
Sugavaneswaran et al. "Analytical and experimental investigation on elastic modulus of reinforced additive manufactured structures" *Mater. Des.* 66 (2015) pp. 29-36.
Sutherland, S.E. "Sketchpad, A man-machine graphical communication system" *Mass. Instit. Techn.* (1963) pp. 1-177.
Talagani et al. "Numerical simulation of big area additive manufacturing (3D printing) of a full size car" *SAMPE J.* 51 (2015) pp. 27-34.
Tang et al. "Integration of topology and shape optimization for design of structural components" *Struct. Multidiscipl. Optim.* 22 (2001) pp. 65-82.
Tang et al. "A review of methods for improving the interfacial adhesion between carbon fiber and polymer matrix" *Polym. Comp.* 18 (1997) pp. 100-113.
Taylor et al. "Inkjet printing of carbon supported platinum 3-D catalyst layers for use in fuel cells" *J. Power Sources* 171 (2007) pp. 101-106.
Tencate. "Toray Cetex® TC1000 Premium PEI" *Toray Adv. Comp.* (2017) pp. 1-4.
Tuttle et al. "Feature recognition for NC part programming" *Comp. Indust.* 35 (1998) pp. 275-289.
Ullman, D.G. "The Mechanical Design Process" *McGraw-Hill* (2010) pp. 1-450.
Ultimaker. "Cura 3D Printing Slicing Software" Ver. 2.5. (2017) pp. 1-2.
Van Haste, F. "Stop black specks!" *Plastics Techn.* (2007) pp. 1-3.
Várady et al. "Reverse engineering of geometric models" *Comp.-Aided Des.* 29(4) (1997) pp. 253-268.
Vega et al. "The effect of layer orientation on the mechanical properties and microstructure of a polymer" *J. Mater. Eng. Perf.* 20 (2011) pp. 978-988.
Vélez-García et al. "Sample preparation and image acquisition using optical-reflective microscopy in the measurement of fiber orientation in thermoplastic composites" *J. Micro.* 248 (2012) pp. 23-33.
Vlachopoulos et al. "The role of rheology in polymer extrusion" *New Techn. Extrus. Conf.* (2003) pp. 20-21.
Wang et al. "A model research for prototype warp deformation in the FDM process" *Int'l J. Adv. Manuf. Tech.* 33 (2007) pp. 1087-1096.
Weiss et al. "Low-cost closed-loop control of a 3D printer gantry" *Rapid Prototyp. J.* 21 (2015) pp. 482-490.
Wertz, J.R. "Spacecraft attitude determination and control" *Springer* (1978) pp. 1-872.
West, D.M. "What happens if robots take the jobs? The impact of emerging technologies on employment and public policy" *Centre Techn. Innov. Brookings* (2015) pp. 1-22.
West et al. "A process planning method for improving build performance in stereolithography" *Comp.-Aided Des.* 33 (2001) pp. 65-79.
Wheeler, A. "GE Aviation's First 3D Printed Engine Component for the GE 90 Engine" engineering.com (2015) pp. 1-2.
Wohlers et al. "History of additive manufacturing" *Wohlers Associates, Inc.* (2016) pp. 1-38.
Wong et al. "A review of additive manufacturing" *ISRN Mech. Eng.* 2012:208760 (2012) pp. 1-10.
Wu et al. "Implementation of CL points preprocessing methodology with NURBS curve fitting technique for high-speed machining" *Comp. Indust. Eng.* 81 (2015) pp. 58-64.
Wu et al. "Analysis on machined feature recognition techniques based on B-rep" *Comp.-Aided Des.* 28(8) (1996) pp. 603-616.
Xu et al. "Considerations and selection of optimal orientation for different rapid prototyping systems" *Rapid Prototyp. J.* 5 (1999) pp. 54-60.
Xue et al. "Mechanistic Fatigue Modeling for Continuous Fiber-Reinforced Polymer Matrix Composites" *Int'l SAMPE Tech. Conf.* (2013) pp. 801-812. (Abstract only).
Yan et al. "A review of rapid prototyping technologies and systems" *Comp.-Aided Des.* 28 (1996) pp. 307-318.
Young, W.B. "Capillary impregnation into cylinder banks" *J. Coll. Interf. Sci.* 273 (2004) pp. 576-580.
Zdyrko et al. "Polymer Brushes by the 'Grafting to' Method" *Macromol. Rap. Comm.* 32 (2011) pp. 859-869.
Zdyrko et al. "Nano-patterning with polymer brushes via solvent-assisted polymer grafting" *Soft Matt.* 4 (2008) pp. 2213-2219.
Zdyrko et al. "Synthesis and Surface Morphology of High-Density Poly(ethylene glycol) Grafted Layers" *Langmuir* 19 (2003) pp. 10179-10187.
Zhang et al. "A Facet Cluster-based Method for Build Orientation Generation in Additive Manufacturing" *Proc. Ann. Int'l Sol. Freeform Fabr. Symp.* (2016) pp. 23-35.
Zhang et al. "Build Orientation Determination for Multi-material Deposition Additive Manufacturing with Continuous Fibers" *Procedia CIRP* 50 (2016) pp. 414-419.
Zhang et al. "Feature based building orientation optimization for additive manufacturing" *Rapid Prototyp. J.* 22 (2016) pp. 358-376. (Abstract only).
Zhang et al. "Build orientation optimization for multi-part production in additive manufacturing" *J. Intell. Manufact.* (2015) pp. 1-15.
Zhang et al. "Evaluating the design for additive manufacturing—a process planning perspective" *Procedia CIRP* 21 (2014) pp. 144-150.
Zhang et al. "An integrated decision-making model for multi-attributes decision-making (MADM) problems in additive manufacturing process planning" *Rapid Prototyp. J.* 20 (2014) pp. 377-389.
Zhang et al. "Using AM feature and multi-attribute decision making to orientate part in additive manufacturing" *High Val. Manuf.: Adv. Res. Virt. Rapid Prototyp.* (2013) pp. 411-416.
Zhong et al. "Short fiber reinforced composites fused deposition modeling" *Mater. Sci. Eng.* A301 (2001) pp. 125-130.
Zhoushan Howly Screw Co., Ltd. Available screw geometries. www.howlyscrew.com (Web only).
Zhuang et al. "Topology optimization of multi-material for the heat conduction problem based on the level set method" *Eng. Optim.* 42 (2010) pp. 811-831.
Ziemian et al. "Tensile and fatigue behavior of layered acrylonitrile butadiene styrene" *Rapid Prototyp. J.* 21 (2015) pp. 270-278.
Zuo et al. "A simple and compact python code for complex 3D topology optimization" *Adv. Eng. Softw.* 85 (2015) pp. 1-11.
ISA. "International Search Report & Written Opinion" PCT/US2016/048580 (dated Nov. 14, 2016) pp. 1-8.
ISA. "International Search Report & Written Opinion" PCT/US2017/033983 (dated Aug. 20, 2017) pp. 1-9.
ISA. "International Search Report & Written Opinion" PCT/US2019/046303 (dated Nov. 13, 2019) pp. 1-11.
ISA. "International Search Report & Written Opinion" PCT/US2020/022037 (dated Jul. 22, 2020) pp. 1-13.

\* cited by examiner

IN-LINE POLYMERIZATION FOR CUSTOMIZABLE COMPOSITE FIBER MANUFACTURE IN ADDITIVE MANUFACTURING

CROSS REFERENCE TO RELATED APPLICATION

This application claims filing benefit of United States Provisional Patent Application Ser. No. 63/071,642, having a filing date of Aug. 28, 2020, which is incorporated herein by reference in its entirety.

BACKGROUND

Additive manufacturing refers to any method for forming a three-dimensional ("3D") object in which successive layers of material are laid down according to a controlled deposition and solidification process. The main differences between additive manufacturing processes are the types of materials to be deposited and the way the materials are deposited and solidified. Fused filament fabrication (also commonly referred to as fused deposition modeling) extrudes materials including liquids (e.g., polymeric melts or gels) and extrudable solids (e.g., clays or ceramics) to produce a layer, followed by spontaneous or controlled solidification of the extrudate in the desired pattern of the structure layer. Other additive manufacturing processes include those that deposit solids in the form of powders or thin films followed by the application of energy and/or binders often in a focused pattern to join the deposited solids and form a single, solid structure having the desired shape. Generally, each layer is individually treated to solidify the deposited material prior to deposition of the succeeding layer, with each successive layer becoming adhered to the previous layer during the solidification process.

Unfortunately, while additive manufacturing technologies have become much more common and less expensive in recent years, the technology is primarily limited to formation of prototypes, as the formation materials have been limited to those that can be extruded in a relatively narrow temperature range and generally exhibit low strength characteristics. Since continuous fiber reinforced additive manufacturing is a fairly new technology, few options for feedstock material exist that allow the extrusion of liquid melts with a solid reinforcement. As such, methods for producing feedstock material and incorporating feedstock into additive manufacturing processes are needed.

SUMMARY

The present disclosure is directed to methods for the continuous manufacture of polymer impregnated fibers that can be used in additive manufacturing processes. One example aspect of the present disclosure is a method for varying the composition and/or materials for generating a polymer in impregnated fibers using an infiltration system that includes a series of two or more solutions. The two or more solutions can include components such as monomer subunits of a polymer, catalysts for initiating polymerization of monomer subunits, and/or chemicals to quench polymerization. Additionally, the infiltration system can include a bypass or other similar feature(s) to adjust exposure of a fiber bundle running through the series of two or more solutions to only contact a subset of the two or more solutions and/or to exchange a first solution of the two or more solutions for a second solution having a different composition from the first solution. In this manner, the infiltration system can be used to generate a customizable polymer impregnated continuous fiber that may improve additive manufacturing processes by reducing system downtime needed due to switching the printing material. This may also provide greater customizability in manufacturing materials, by allowing for the continuous manufacture of components that include regions with different material compositions.

One aspect of example implementations can include a solution exhibiting a relatively low viscosity during impregnation. For instance, a solution can include monomer subunits rather than a formed polymer and the viscosity of said solution can be lower than would be the case if the solution included the formed polymer. An advantage of a reduced viscosity can include improved impregnation of the solution into the fiber bundle and, upon polymerization, the impregnated fiber can include an excellent distribution of polymer within the fiber bundle. Additionally, a lower viscosity solution may provide for faster impregnation, which can improve the timescale for forming composite fibers. Thus, implementations of the present disclosure may also provide economic advantages for large scale composite fiber production and/or additive manufacturing systems that are directly coupled to systems for composite fiber manufacture.

Another example aspect of the present disclosure is directed to implementations including an additive manufacturing process. For example, a process can include depositing a composite fiber produced according to example implementations herein on a print bed. In some implementations, the composite fiber can be co-extruded along with a formation material from a print head as a composite material and deposited onto a print bed. In one embodiment, a formation material can be provided to a print head in the form of a second polymeric fiber; for instance, a polymeric fiber that can include the same polymer as is contained in the composite fiber. In general, the composite fiber and, optionally, the formation material can be located on the print bed according to a predetermined pattern as the print head and/or the print bed is moved to build a composite structure and form the additive manufactured product.

BRIEF DESCRIPTION OF THE FIGURES

A full and enabling disclosure of the present invention, including the best mode thereof to one skilled in the art, is set forth more particularly in the remainder of the specification, which includes reference to the accompanying figures, in which.

Figure 1A:
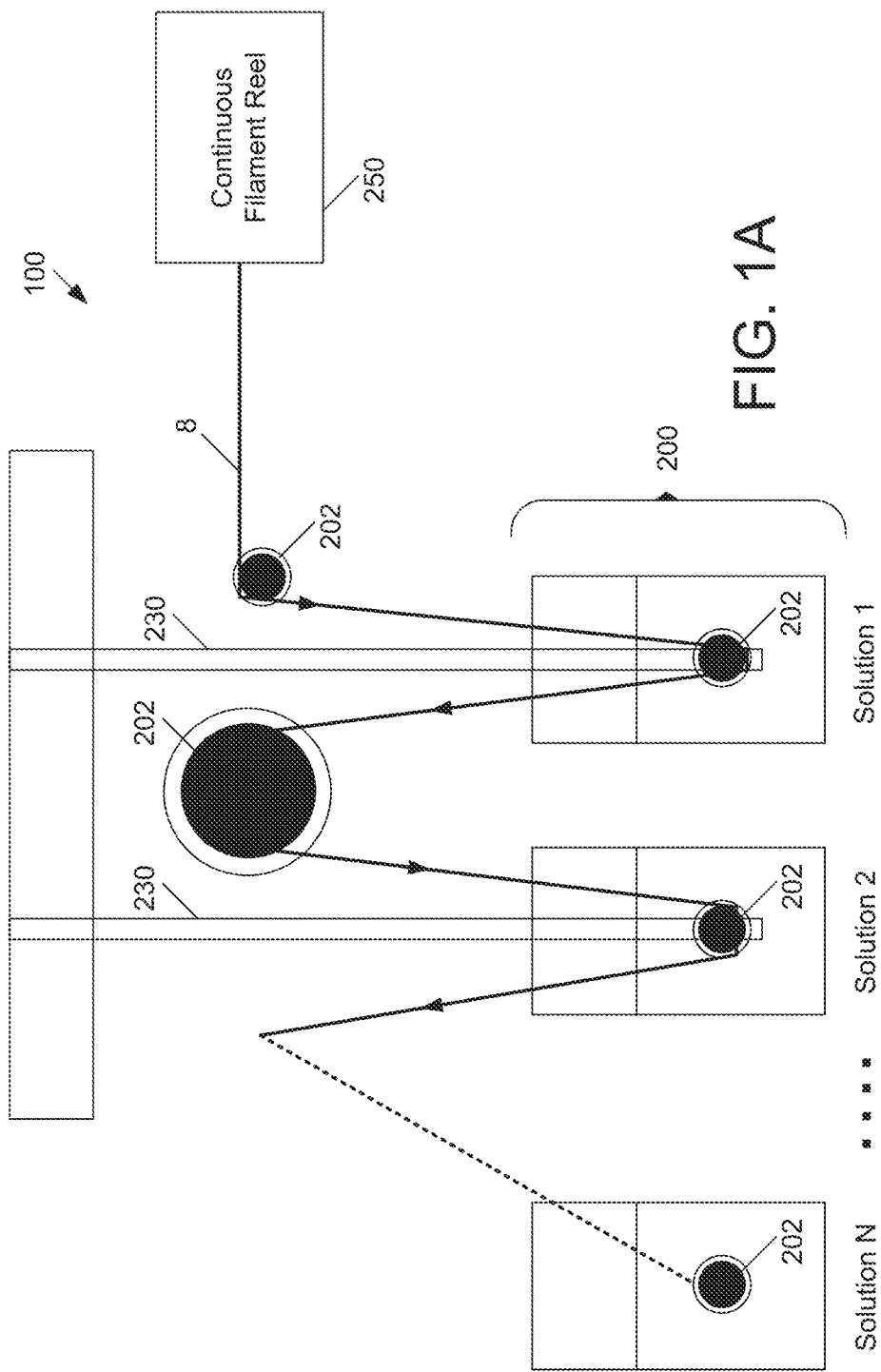
FIG. 1A illustrates a schematic diagram displaying one example implementation for forming a composite fiber in accordance with the present disclosure.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only and is not intended as limiting the broader aspects of the present invention, which broader aspects are embodied exemplary constructions.

The present disclosure is directed to methods and systems for producing a composite fiber for additive manufacturing. In some implementations, these methods can be incorporated as a coupled system for producing a composite fiber and directly providing the composite fiber to an additive manufacturing system. Aspects of the present disclosure can provide improvements for coupled systems since example methods and systems can include components for generating the composite fiber by incorporating a polymer within and/or on a continuous fiber. Further, implementations can include methods and systems for directly generating the polymer as the continuous fiber moves through the system, which, in turn, can provide greater control for the composition of the polymer along the entirety of the continuous fiber. In this manner, additive manufacturing systems can utilize a composite fiber that includes variable polymer composition(s) along a length of a composite fiber. As such, heterogeneous materials can be produced using additive manufacturing without changing printing reels. Further, using a single continuous fiber that includes variable components along a length of the composite fiber may provide improved characteristics, such as greater strength for a heterogeneous material as compared to systems that use separate, discontinuous printing reels in forming a composite structure.

An example implementation of the present disclosure can include a method for forming a composite fiber for an additive manufacturing device. An aspect of the method can include generating an infiltrated fiber by immersing a first region of a continuous fiber in a first solution that includes a first monomer, the first solution can be included in a series of two or more solutions. Another aspect can include immersing the infiltrated fiber in a second solution in the series of two or more solutions to generate a first polymer, the first polymer incorporating one or more units of the first monomer. As part of generating the first polymer, the first polymer can be produced in and/or on the first region of the continuous fiber (e.g., the first polymer is in contact with the continuous fiber). Since the continuous fiber can include a roving made up of a plurality of individual filaments, the first polymer can be generated at an interior (e.g., "in") of the first region of the continuous fiber and/or generated at an exterior (e.g., "on") of the first region of the continuous fiber. Another aspect can include washing at least the first region of the continuous fiber with a solvent to produce a wet composite fiber. Washing the first region of the continuous fiber can be used to remove residual and/or unreacted materials (e.g., the first monomer, the first catalyst, etc.) that are not incorporated in the first polymer. Another aspect can include removing solvent from the wet composite fiber to produce a dried composite fiber as may be incorporated in an additive manufacturing system.

In general, the first monomer can include any suitable monomer for generating a polymer. For some implementations of the present disclosure, the first monomer can include caprolactam, adipoyl chloride, hexamethylene diamine, or adipic acid. In such implementations, the polymer can include nylons or mixtures of nylons including, but not limited to, nylon 6,6 and nylon-6.

In certain implementations, other monomers can be included in the series of two or more baths, such as monomers for polymers that are not nylons or monomers for copolymerization with another monomer of a system. Some non-limiting examples of polymers that can be generated according to example implementations include: amorphous thermoplastics such as polysulfone (PSU), poly(ethersulfone) (PES), and polyetherimide (PEI), as well as semi-crystalline thermoplastics, such as poly(phenylene sulfide) (PPS), polyaryl ether ketones (PAEK) including polyether ketones (PEK) and polyetheretherketone (PEEK), partly aromatic polyamides such as polyphthalamide (PPA), liquid-crystalline polymers (LCP), polyphenylene sulfones (PPSU), as well as blends and copolymers of thermoplastics.

One aspect of example implementations according to the present disclosure can include improved incorporation of a monomer in and/or on a continuous fiber due at least in part to a relatively low viscosity of a solution that includes the monomer. Since polymer solutions and polymer melts can be more viscous compared to solutions of a monomer or oligomer of a polymer, incorporating polymer directly into/onto a continuous fiber can lead to issues such as little or no polymer reaching the core of a continuous fiber (an issue that can be especially difficult for fiber bundles that include more than 1000 individual filaments) as well as incomplete coverage of an outer surface of the fiber. By performing polymerization of monomer impregnated fibers during manufacture, implementations of the present disclosure can not only provide improved control over polymer composition(s) along a fiber length, but can also provide improved impregnation quality of the fibers.

In some implementations of the disclosure, the viscosity in each solution bath in the series of two or more solution baths can be about 0.3 centipoise (cP) or more, about 0.5 cP or more, about 0.7 cP or more, about 0.9 cP or more, or about 1.0 cP or more and about 5.0 centipoise (cP) or less, about 4.0 cP or less, about 3.0 cP or less, about 2.0 cP or less, or about 1.5 cP or less.

After immersion in a first solution that includes a monomer (or a combination of monomers), a continuous fiber can be immersed in a second solution that can include one or more additional monomers (which can be the same or different as the first monomer(s), a catalyst, or both). For certain implementations, a second monomer can include caprolactam, adipoyl chloride, hexamethylene diamine, or adipic acid. In general, a catalyst can include any suitable polymerization catalyst such as a nucleophile (e.g., a Lewis base such as ammonia or a hydroxide), an electrophile (e.g., a Lewis acid such as boron trifluoride or a proton), a transition metal catalyst (e.g., platinum, palladium, copper, silver, etc., as a coordinated ligand; a zero oxidation state transition metal that can be deposited on a support; or other similar transition metal catalysts), and/or heat (e.g., a polymerization catalyzing solution can be at a higher temperature than a previous solution). Though not technically catalysts since they are consumed, radical initiators such as benzoyl peroxide may also be included in certain implementations in a solution to initiate polymerization.

As should be understood, the terms first solution and second solution as used herein do not necessarily limit the order in which these solutions are used in implementations, according to the present disclosure. For certain implementations, a continuous fiber can be immersed initially in a solution containing materials disclosed for the second solution (e.g., a catalyst or a second monomer), and subsequently immersed in another solution containing materials disclosed for the first solution (e.g., a first monomer). Further, additional solutions that can be included in the series of two or more solutions (e.g., a third solution, a fourth solution, etc.), and these need not indicate an order unless it is specifically noted that immersion in the solution occurs after or before immersion in another of the series of two or more solutions. Thus, the series of two or more solutions can be generally defined as including: a first monomer, a second monomer, a catalyst, or any combination thereof; and each of the first monomer, the second monomer, and/or the catalyst can be independently included in at least two of the solutions.

Aspects of some implementations can include a polymerization environment. A polymerization environment can include a region or area that includes some or all of the series of two or more solutions that is configured to adjust the temperature and/or atmosphere that the solutions are exposed to during polymerization. For example, polymerization of certain monomers may be quenched on exposure to oxygen. In certain implementations, some or all of the steps for continuous manufacture of polymer impregnated fibers may occur in a polymerization environment that includes a substantially inert atmosphere of nitrogen and/or argon. Further, these implementations may also include chemical species in the polymerization environment such as an oxygen scavenger (e.g., ascorbic acid) that can react with oxygen to eliminate oxygen from the polymerization environment.

As another example, polymerization kinetics and/or diffusion kinetics may be adjusted by increasing or decreasing the temperature of the two or more solutions. For some implementations, the method can include immersing the continuous fiber in a solution of the series of two or more solutions held at a temperature. More particularly, the temperature can be adjusted to from about 0° C. to about 300° C., such as from about 5° C. to about 200° C., from about 10° C. to about 100° C., from about 20° C. to about 80° C., or from about 22° C. to about 70° C. In general, the temperature for each solution can be independently adjusted. As such, a temperature range can apply independently to each solution in a series of two or more solutions.

Further aspects of a polymerization environment can include heaters that are positioned external to solutions in the series of two or more solutions. A heater can be used to polymerize and/or cure (e.g., crosslink) a polymer generated in the process, to remove solvent, to increase the extent of polymerization, and/or to partially liquify the polymer (e.g., for forming the composite fiber using a die), as well as combinations thereof. In general, a heater can be positioned to surround a portion of a composite fiber or a solution as the composite fiber is moved through a system.

In some example implementations, methods for manufacture of polymer impregnated continuous fibers can include immersing a second region of a continuous fiber, the second region being different from a first region, in a third solution of a series of two or more solutions. Such a technique can be used to vary the composition of the polymer along a length of a continuous fiber to produce a composite fiber having a variable composition. A third solution can include a different monomer content as compared to a previous solution. For instance, a third solution can include a third monomer, such as a monomer that can be used to synthesize one or more of the example polymers disclosed herein. After immersing the second region of the continuous fiber in such a third solution, a second polymer can be generated in or on the second region of the continuous fiber, the second polymer incorporating the third monomer.

In certain implementations, generating a second polymer can include immersing a second region of the continuous fiber in a third solution followed by immersion in a fourth solution. Example aspects of the fourth solution can include additional monomers and/or catalysts that can react with the third monomer to generate the second polymer. In general, the first polymer and the second polymer can include a variation in monomer units as compared to one another to produce a variable composition along a length of a continuous fiber.

As one example process for modifying immersion of a continuous fiber, example systems can include mechanisms for adjusting the path of the continuous fiber. For instance, the rollers directing movement of the continuous fiber through the series of two or more solutions may be connected to a mechanical lift that can adjust the position of rollers from an immersion position (e.g., the rollers or a portion of the rollers are in contact with the solution) which exposes the continuous fiber to a solution to a dry position (e.g., the rollers are not in contact with the solution) which does not expose the continuous fiber to a solution. In this manner, implementations of the present disclosure can include adjusting the position of the rollers to immerse a second region of a continuous fiber in the third solution.

Alternatively, or additionally, processes for modifying immersion of a continuous fiber can include adjusting the composition of the solutions in the series of two or more solutions. For example, each solution in a series of two or more solutions can be contained in a vessel. For certain implementations, the vessel can be connected to a system for adding new material to the vessel (e.g., a new solution that can include a monomer, a catalyst, etc.) and/or removing material from the vessel (e.g., a prior solution such as the first solution). In this manner, implementations can adjust the composition of a solution included in the series of two or more solutions by changing the content of a vessel.

One aspect of the series of two or more solutions can include an agitation system for stirring, sonicating, or otherwise mixing one, some, or all of the solutions in the series of two or more solutions.

Implementations of the present disclosure can be used to manufacture composite fiber that can have varying polymer compositions for use in additive manufacturing. Some example implementations can include methods for co-production of a composite fiber and a material incorporated with the composite fiber. For instance, in certain implementations, a composite fiber can be directly provided to an additive manufacturing device (e.g., a 3D printer). The composite fiber can be heated to a deposition temperature by the additive manufacturing device and the heated composite fiber deposited on a print area.

During heating of a composite fiber, the polymer can soften to a partially or fully liquified state and can then be deposited and/or shaped during deposition on the print area. For instance, some implementations may include a mandrel on a print area that can provide a form on which a heated composite fiber can be applied.

For certain implementations, a formation material may be incorporated with a composite fiber prior to deposition by use of an additive manufacturing device. For instance, a polymer or another composite fiber incorporating a polymer may be combined with a first composite fiber prior to deposition. Aspects of such a process may yield improved material quality for 3D printed objects, for instance in forming a 3D printed object that includes one or more composite fibers, each of which is capable of including a varying polymer composition along a length of the fiber.

Practice of implementations disclosed herein may lead to further implementations or result in improvements not specifically described. For instance, some implementations may include an overlap area for a first region and a second region of a continuous fiber. This overlap area can include both a first polymer and a second polymer in a blend. Thus, example methods may decrease the likelihood of a region of a continuous fiber that is not combined with any polymeric material by immersing a second region of the continuous fiber (the second region including at least a portion of the first region of the continuous fiber) in a solution (e.g., a third solution) in a series of two or more solutions. In this manner, discontinuities along a continuous fiber may be decreased in some implementations.

Composite fibers of the present disclosure can include a high-strength continuous fiber in conjunction with one or more polymers, and in some implementations, with a thermoplastic polymer that exhibits a high glass transition temperature. A composite fiber can be utilized to address stiffness, strength, and environmental performance shortcomings (e.g., thermal resistance) that have been associated with forming parts with conventional techniques and materials (e.g., polymers alone). Disclosed methods and materials can be particularly beneficial for reinforcing parts in a direction that is non-orthogonal to the build direction of the part. Thus, the composite fibers can allow for the formation of continuous fiber reinforced composite parts having complicated geometries and exhibiting high performance characteristics with reinforcement in any, as well as multiple different, directions, according to an additive manufacturing process.

FIG. 1A schematically illustrates one example method for forming a composite fiber. A method can include immersing a continuous fiber 8 into a series of two or more solutions 200 that can include monomers, catalysts, and/or other components that can be used for generating a polymer dissolved in a solvent. The continuous fiber 8 can be moved through the infiltration system 100 for producing the composite fiber using one or more rollers 202. For example, a reel 250 can carry a fiber bundle of the continuous fiber 8. The continuous fiber can be pulled through the infiltration system 100 by the one or more rollers 202 to move the continuous fiber along a fiber path as indicated by the arrows. As shown, the fiber path can immerse the continuous fiber 8 in solution 1 (e.g., a first solution) and solution 2 (e.g., a second solution). In certain embodiments, additional solutions (e.g., solution N) can be included and the fiber path extended so that the continuous fiber 8 is immersed in the additional solution(s), as indicated by the dashed line.

Figure 1B:
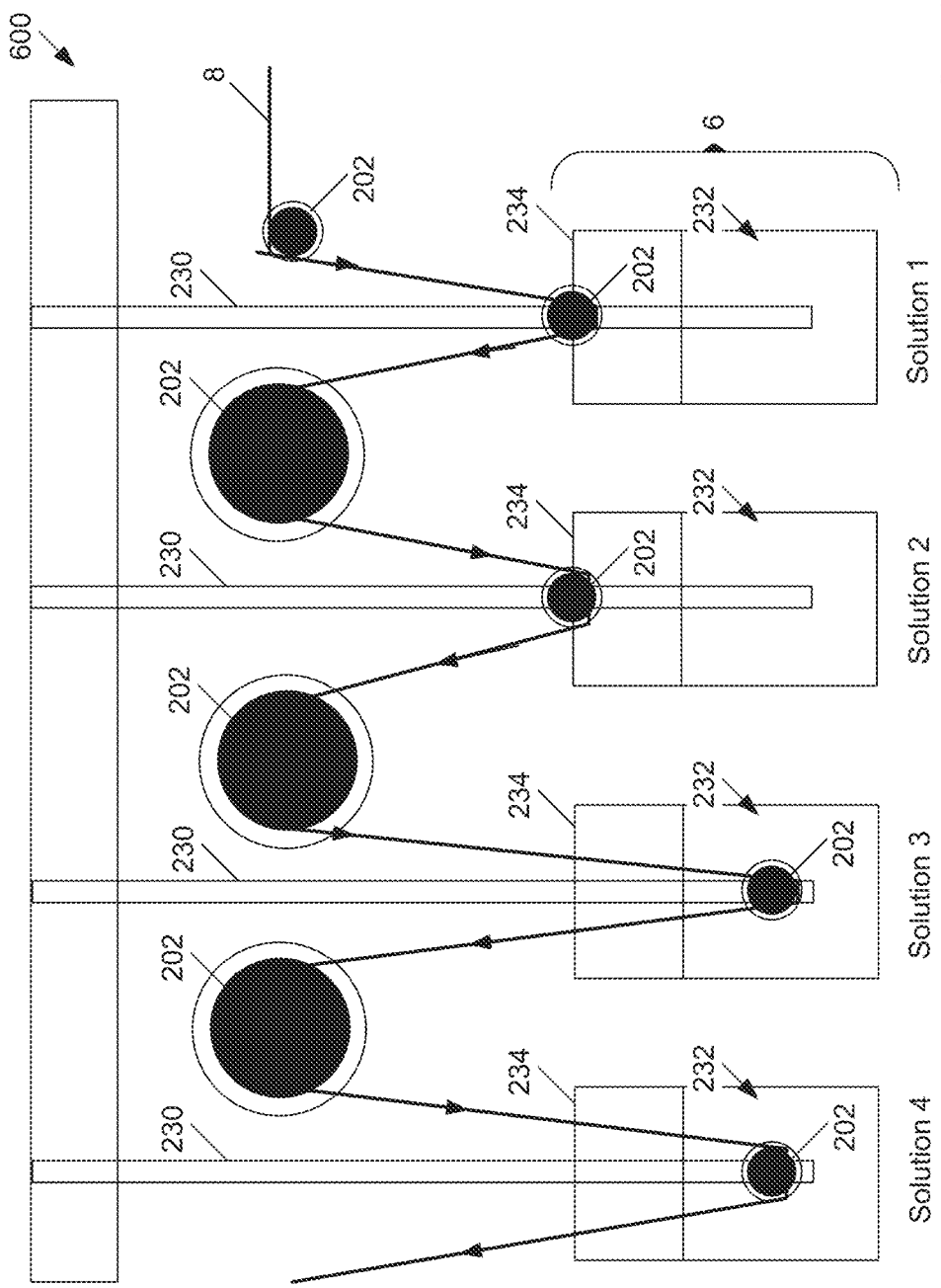
FIG. 1B illustrates a schematic diagram displaying an example aspect of some implementations for forming a composite fiber in accordance with the present disclosure.

In some implementations, one or more of the rollers 202 can be attached to a mechanical system 230 for adjusting the height of the rollers 202. The mechanical system 230 can be used to allow the continued movement of the continuous fiber 8 along the fiber path, while the continuous fiber 8 is exposed to different solutions in the series of two or more solutions 200. For example, FIG. 1B schematically illustrates one example implementation for an infiltration system 600 configured to adjust the position of at least some of the rollers 202. The infiltration system 600 illustrates that the rollers 202 for solution 1 and solution 2 are adjusted so that they are not in contact with the liquid solution 232 in the vessel 234. The rollers 202 for solution 3 and solution 4 are adjusted so that they are in contact with the liquid solution 232 in the vessel 234. To adjust the position of the rollers 202, a mechanical system 230 can independently move one or more of the rollers 202 along a vertical shaft. While illustrated as the rollers 202 being displaced without the shaft moving, it should be understood that alternative implementations can provide similar functionality using different mechanisms, such as including component(s) where the mechanical system 230 itself can be configured to move without adjusting the position of a roller 202 relative to the shaft.

While the composite fibers can incorporate any continuous fiber 8 as is known in the art, in particular embodiments, the continuous fiber 8 can be a high strength, high performance continuous fiber. The high strength continuous fiber 8 can be utilized as an individual filament (e.g., as a porous or shaped filament that can be permeated with the polymer solution) or as a bundle of individual filaments, e.g., a roving. As used herein, the term "roving" generally refers to a bundle of generally aligned individual filaments and is used interchangeably with the term "tow." The individual filaments contained within the roving can be twisted or can be straight, and the bundle of individual filaments can be twisted about one another or generally parallel continuous filaments with no intentional twist to the roving. Although different filaments can be used in a roving, it can be beneficial in some embodiments to utilize a roving that contains a plurality of a single filament type; for instance, to minimize any adverse impact of using filament types having a different thermal coefficient of expansion. The number of filaments contained in a roving can be constant or can vary from one portion of the roving to another and can depend upon the material of the filaments incorporated therein. A roving can include, for instance, from about 500 individual filaments to about 100,000 individual filaments, or from about 1,000 individual filaments to about 75,000 individual filaments, and in some embodiments, from about 5,000 individual filaments to about 50,000 individual filaments.

The continuous fiber 8 can possess a high degree of tensile strength relative to the mass. For example, the ultimate tensile strength of a continuous fiber 8 can be about 3,000

MPa or greater. For instance, the ultimate tensile strength of a continuous fiber 8, as determined according to ASTM D639 (equivalent to ISO testing method 527), is typically from about 3,000 MPa to about 15,000 MPa, in some embodiments from about 4,000 MPa to about 10,000 MPa, and in some embodiments from about 5,000 MPa to about 6,000 MPa. Such tensile strengths may be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length may thus be about 2,000 Megapascals per gram per meter ("MPa/g/m") or greater, in some embodiments about 4,000 MPa/g/m or greater, and in some embodiments, from about 5,500 to about 30,000 MPa/g/m.

A continuous fiber 8 may be an organic fiber or an inorganic fiber or a combination thereof. For example, a continuous fiber 8 may include a metal (e.g., copper, steel, aluminum, stainless steel, etc.), basalt, glass (e.g., E-glass, A-glass, C-glass, D-glass, AR-glass, R-glass, S1-glass, S2-glass, etc.), carbon (e.g., amorphous carbon, graphitic carbon, or metal-coated carbon, etc.), nanotubes, boron, ceramics (e.g., boron, alumina, silicon carbide, silicon nitride, zirconia, etc.), aramid (e.g., Kevlar® marketed by DuPont™, Wilmington, Del.), synthetic organics (e.g., polyamide, ultra-high molecular weight polyethylene, paraphenylene, terephthalamide, and polyphenylene sulfide), polybenzimidazole (PBI) filaments, and various other natural or synthetic inorganic or organic materials known for forming fibrous reinforcing compositions. However, the continuous fiber 8 can generally be formed of materials having a melting temperature greater than the deposition temperature of the additive manufacturing process in which the composite fiber will be used and greater than the thermoplastic polymer that will be combined with the continuous fiber in forming the composite fiber. The materials used to form the fiber can include various additives as are known in the art, e.g., colorants, plasticizers, etc.

Carbon fibers are particularly suitable for use as the continuous fiber in one embodiment. Carbon fiber can typically have a tensile strength to mass ratio in the range of from about 5,000 to about 7,000 MPa/g/m.

The continuous fiber can generally have a nominal diameter of about 2 micrometers or greater; for instance, about 4 to about 35 micrometers, and in some embodiments, from about 5 to about 35 micrometers.

Referring again to FIG. 1, a composite fiber can be produced according to example implementations by immersing a continuous fiber 8 in a series of two or more solutions 200 that include monomer(s) and/or catalyst(s) dissolved in a solvent. For instance, the continuous fiber 8 can be pulled through a series of two or more solutions 200 that include monomer(s) for generating a polymer such as nylon 6,6. As an example for illustration, a first solution (e.g., solution 1) can include hexamethylene diamine and a second solution (e.g., solution 2) can include adipoyl chloride (or vice versa). As the continuous fiber 8 is pulled through the first solution, some of the hexamethylene diamine can infiltrate the continuous fiber 8, and as the region infiltrated with hexamethylene diamine is pulled through the second solution, the hexamethylene diamine can react with the adipoyl chloride to generate nylon 6,6.

The continuous fiber 8 can generally incorporate any monomer, and generation of the polymer results in the polymer associated with the continuous fiber 8. Some examples of polymers that can be generated using example systems can include nylons, acrylates, polysulfone (PSU), poly(ethersulfone) (PES), polyetherimide (PEI), as poly (phenylene sulfide) (PPS), polyaryl ether ketones (PAEK) including polyether ketones (PEK) polyetheretherketone (PEEK), polyphthalamide (PPA), liquid-crystalline polymers (LCP), polyphenylene sulfones (PPSU), resins (e.g., epoxy resins, silicone resins, polyimides, phenolformaldehyde resin), as well as blends and copolymers.

Each solution in the series of two or more solutions can include a solvent for the monomer and/or catalyst, which can encompass organic or aqueous solvents, as determined according to the characteristics of the polymer. For instance, a solution can include hexamethylenediamine in solution with a suitable solvent (e.g., water). The solution can generally include the monomer in an amount up to the solubility of the monomer. For instance, some implementations may include the monomer (e.g., a first monomer, a second monomer, etc.) at a concentration of 40 wt. % or less, such as about 35 wt. % or less, about 30 wt % or less, about 25 wt % or less, about 20 wt % or less, about 15 wt % or less, about 10 wt % or less, or about 5 wt. % or less. For instance, certain implementations can include a series of solutions that can include the monomer in the solution at an amount of from about 1.0 wt. % to about 5 wt. %, or from about 20 wt. % to about 40 wt. %.

As illustrated in FIG. 1, as the continuous fiber 8 is pulled or otherwise immersed in the series of two or more solutions 200, the fiber 8 can pick up monomers contained in the solution to form an infiltrated fiber. Following immersion in two or more solutions, the wet composite fiber can be dried to remove the solvent and form the composite fiber. For instance, the wet composite fiber can be dried through application of energy, e.g., through use of a dryer or other heat source.

Figure 2:
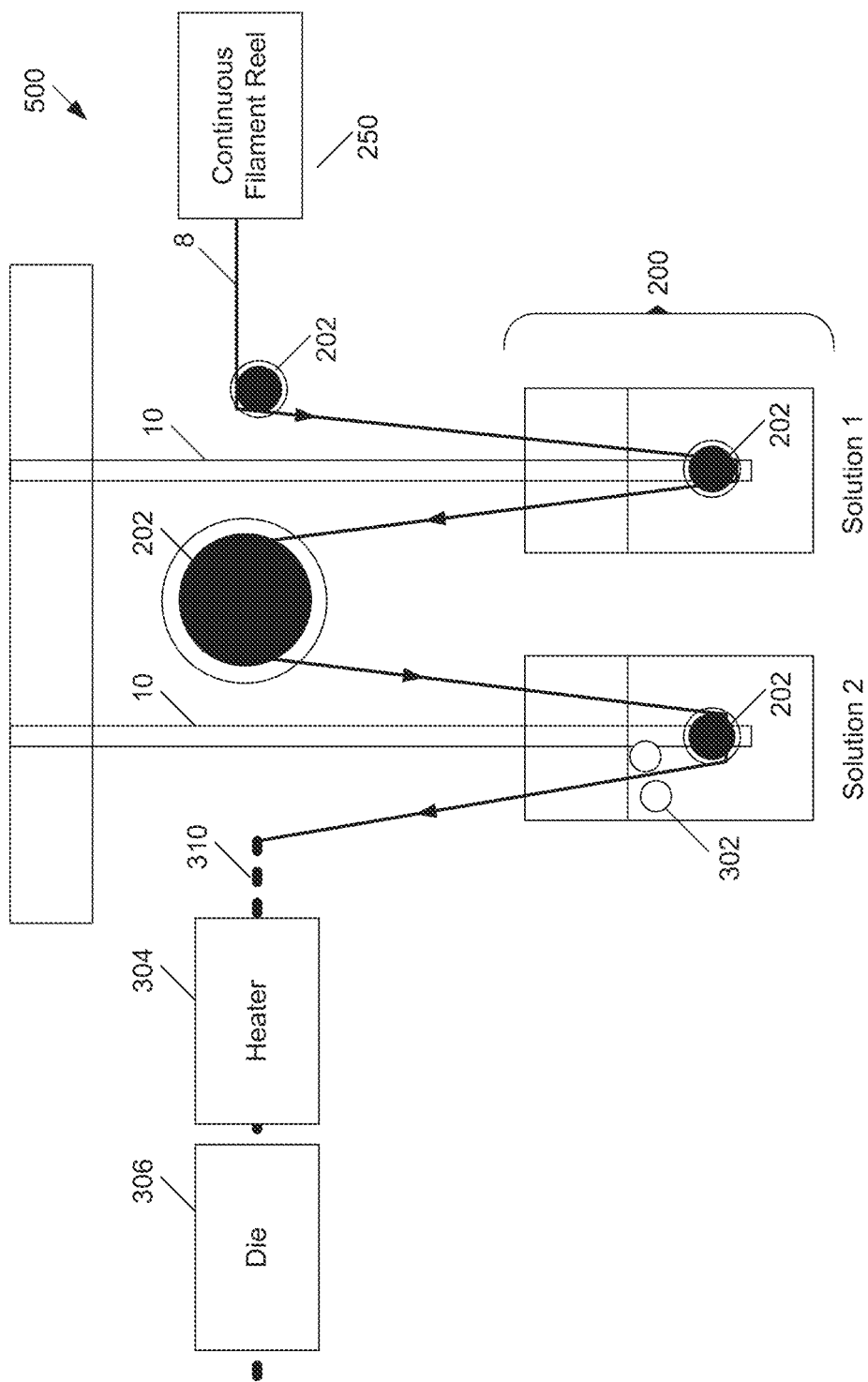
FIG. 2 illustrates a schematic diagram displaying example aspects of some implementations for forming a composite fiber in accordance with the present disclosure.

The composite fiber formation process can include additional formation steps in some implementations. For instance, as illustrated in FIG. 2, certain implementations can include a calendaring step during which the infiltrated fiber can pass through a series of nip rolls 302 or the like that can improve impregnation of the generated polymer into the fiber 8.

In one example implementation, a system can include a heater 304 and/or a die 306 through use of which the composite fiber 310 can be further formed or molded. For instance, either in-line with initial formation or as a component of a separate system, the initially formed composite fiber 310 can be fed through a heater 304 or a heated die 306 that can be configured to incorporate additional polymer into the composite fiber 310, mold the fiber, and/or modify the cross-sectional shape of the composite fiber 310 to, e.g., provide a particular and/or more consistent shape to the composite fiber 310. Depending upon the nature of the die 306, it may prove beneficial to incorporate heaters, dryers, or the like downstream of the die 306. In one implementation, a pultrusion system can be used to encourage motion of the composite fiber 310 through the system and/or one or more subsystems of a process.

Figure 3:
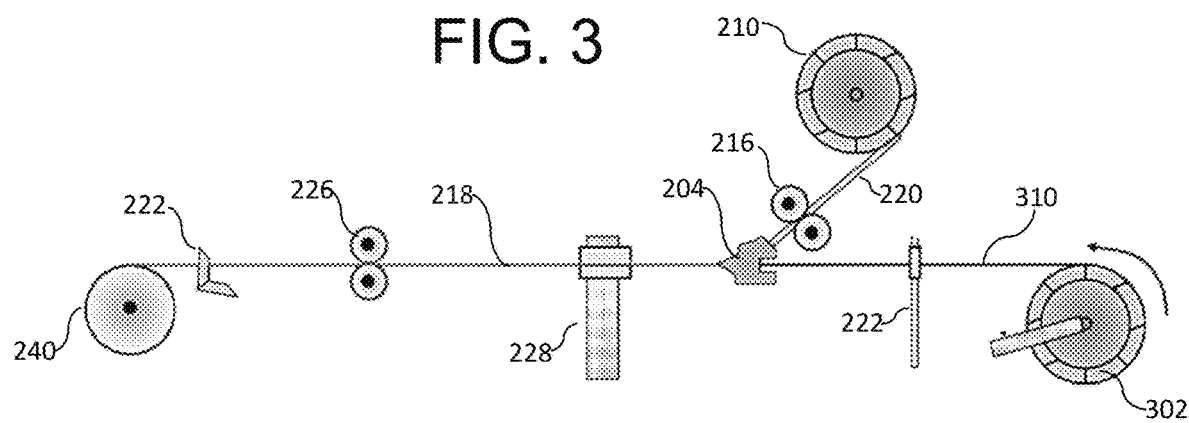
FIG. 3 illustrates aspects of an example composite fiber shaping system that can be included in some implementations in accordance with the present disclosure.

FIG. 3 illustrates one implementation of a shaping system that can be utilized to shape a composite fiber 310 prior to deposition. In this example implementation, the shaping system can be physically separated from the initial formation system and, as such, can include an unwinder 302 that is capable of retaining and unwinding a spool of composite fiber 310 that has been previously formed. Alternatively, as discussed above, a shaping system can be in-line with an initial formation system. A shaping system can include a die 204 through which the composite fiber 310 can pass to be shaped as desired. For instance, following initial formation, a composite fiber 310 can have a noncircular cross-section, such as in the form of a flat tape or the like. A die 204 can be utilized to heat and reshape the composite fiber 310, for instance to exhibit a circular cross-section. Of course, any cross-sectional shape can be provided by a die including, without limitation, flat tapes, noncircular ovals, circular, square, channeled or angled fibers (e.g., U-, V-, or J-shaped fibers), and so forth.

In some embodiments, to improve shaping of the composite fiber 310, the fiber can be contacted with a lubricant 220 at or upstream of the die 204. The lubricant can generally be a polymeric material that can surround and adhere to the composite fiber 310 and encourage the shaping of the composite fiber 310 as it passes through the die 204. In one particular embodiment, the lubricant 220 can include a polymer or polymeric composition that also forms the polymeric component of the composite fiber 310. A polymeric lubricant 220 can be provided to the die 204 as a solid, for instance in the form of a polymer tape or fiber, and can be fed to the die 204 from a spool 210, for instance by use of a feeding motor 216. A polymeric lubricant 220 can provide additional benefit to the composite fiber 310 as well. For instance, the presence of the polymeric lubricant 220 on the surface of the composite fiber 310 can protect the fiber 310 during downstream processing and can prevent the buildup of noils (due to fraying or breakage of components from the composite fiber) and/or excess polymer at downstream processing units.

Figure 4:
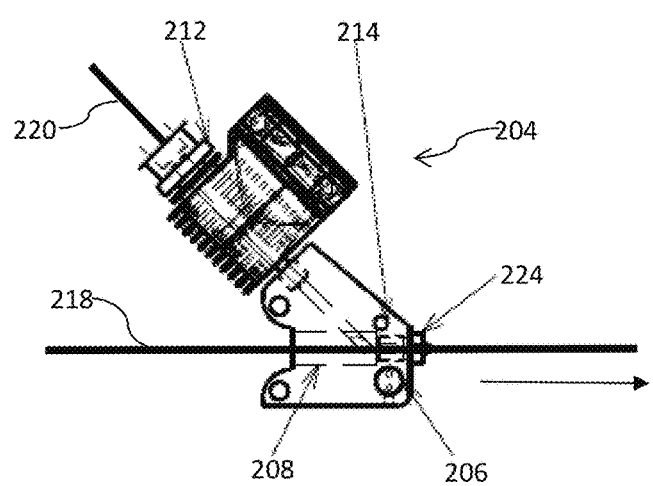
FIG. 4 illustrates aspects of an example die for shaping a composite fiber that can be included in some implementations in accordance with the present disclosure.

In the embodiment of FIG. 3, the lubricant 220 can contact the composite fiber 310 at the die 204. For example and as illustrated in more detail in FIG. 4, the composite fiber 310 and the lubricant 220 in the form of a polymeric fiber can pass into the interior of the die 204, which can be heated; for instance, by use of a heater cartridge 206. The die 204 can be heated to a temperature suitable for melting the polymer component of the composite fiber 310 and the polymer of the lubricant 220. Thus, the die 204 can include a melt zone 208 where the composite fiber 310 and the lubricant 220 can contact one another at a temperature above their respective melting temperatures. A die 204 can also include features as are standard in the art, such as a heat sink, 212, thermocouples 214, etc. Following contact, the hot composite fiber 310, at least partially coated with the lubricant 220, can be forced through the shaping unit 224 of the die 204 to attain the desired cross-sectional shape prior to proceeding to further processing, as indicated by the directional arrow of FIG. 4.

A shaping system can include additional components as are generally known in the art including, without limitation, guides 222, cleaning units 228 (e.g., brushes or rinsing units), sensors 226, and so forth. In those embodiments in which the shaping system is held separately from the deposition system, the shaping system can also include a take-up reel 240, which can collect and store the shaped composite fiber 310 for further use. A take-up reel 240 can also provide tension for pulling the composite fiber 310 through the shaping system, in some embodiments.

Figure 5:
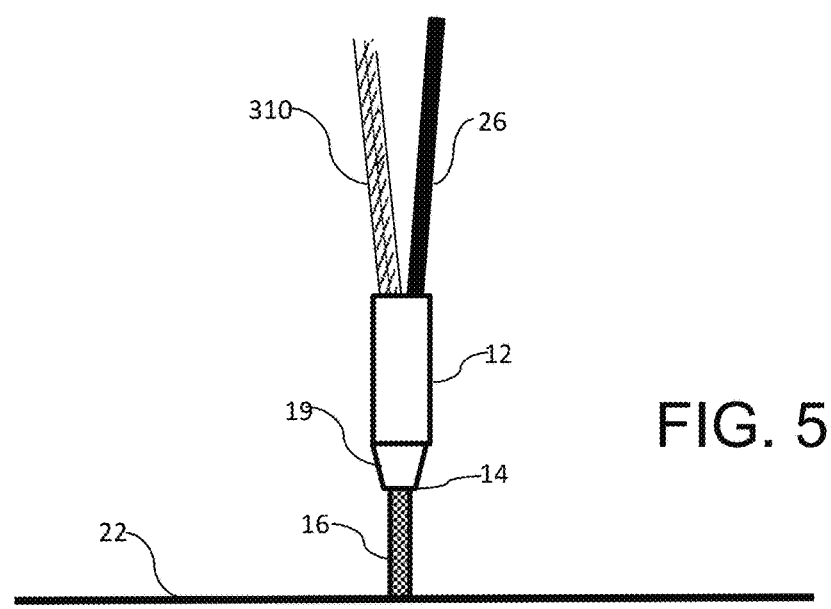
FIG. 5 illustrates an example aspect of some implementations in accordance with the present disclosure.

FIG. 5 illustrates one embodiment of an additive manufacturing process as may be utilized to form a structure incorporating the composite fiber 310. As shown, the composite fiber 310 can be combined with a formation material 26. In this example implementation, the formation material 26 can be provided to a print head 12 in the form of a second fiber. For instance, the formation material 26 can be a metal, a polymeric material, composite material, etc. that is fed to the print head 12 and is heated above the softening or melting temperature of the formation material 26 so as to be combined with the composite fiber 310 within the print head 12. The composite fiber 310 is likewise heated to a temperature above the melting or softening temperature of the polymer of the composite. The composite fiber 310 can be provided to the print head from a conveniently placed storage location; for instance, from a spool of previously formed and shaped composite fiber 310 that can be mounted on an end effector of a deposition system. Alternatively, the composite fiber 310 can be directly provided to the print head from an infiltration system configured to continuously generate the composite fiber 310. After providing the composite fiber 310 to the print head 12, the formation material 26 can blend and/or bond with the polymer of the composite fiber 310, and the formation material 26 can form a partial or continuous coating on the composite fiber 310, thereby forming a composite material 16. The composite material 16 thus formed, that includes a combination of the composite fiber 310 with a formation material 26, can pass through the extrusion tip 14 to the printing surface 22. Alternatively, certain implementations may not include any formation material 26; as such, the composite material 16 passed to the printing surface 22 can include only the composite fiber 310.

In general, the formation material 26 may be formed of one material or an admixture of multiple materials. The formation material 26 can be, for example, a gel, a high viscosity liquid, or a formable solid that can be extruded in the desired pattern. Formation materials likewise can be organic or inorganic. Formation materials can include, without limitation, polymers including thermoplastic polymers or thermoset polymers (e.g., polyolefins, polystyrenes, polyvinyl chloride, elastomeric thermoplastics, polycarbonates, polyamides, etc.), eutectic metal alloy melts, clays, ceramics, silicone rubbers, and so forth. Blends of materials can also be utilized as the formation materials, e.g., polymer blends. The formation materials can include additives as are generally known in the art such as, without limitation, dyes or colorants, flow modifiers, stabilizers, nucleators, flame retardants, and so forth.

In one particular embodiment, the formation material 26 can include the same polymer as the polymer of the composite fiber 310. For instance, the composite fiber 310 can include a continuous fiber incorporating a nylon 6,6 polymer, and the formation material 26 can likewise include nylon 6,6. This can improve blending and bonding of the materials in the print head in formation of the composite material 16.

The composite material 16 can be discharged from the print head 12 at a nozzle 19 during the formation of an individual layer of an additively manufactured product structure. Thus, the nozzle 19 can be sized and shaped as desired depending upon the particular characteristics of the composite material 16 to be discharged. In general, a nozzle 19 can have an outlet on the order of about 10 millimeters or less; for instance, about 5 millimeters or less, or from about 0.5 millimeters to about 2 millimeters, in some embodiments. The shape of the nozzle 19 can also be varied. For instance, a nozzle 19 can have a more rounded radial edge as compared to previously known fused filament fabrication print heads, so as to better accommodate the composite material 16.

Any suitable method for combining the composite fiber 310 and the formation material 26 can be utilized, provided that the continuous fiber of the composite fiber 310 is adequately incorporated with the formation material 26 following deposition. The type of bond formed between the composite fiber 310 and the formation material 26 can depend upon the materials involved. For instance a thermal bond, a chemical bond, a friction bond, an electrostatic bond, etc., as well as combinations of bond types, can be formed between the continuous fiber and the polymer of the composite fiber 310, and between either or both of these components of the composite fiber 310 and the formation material 26 in order that the components will be effectively bonded to one another.

Figure 6:
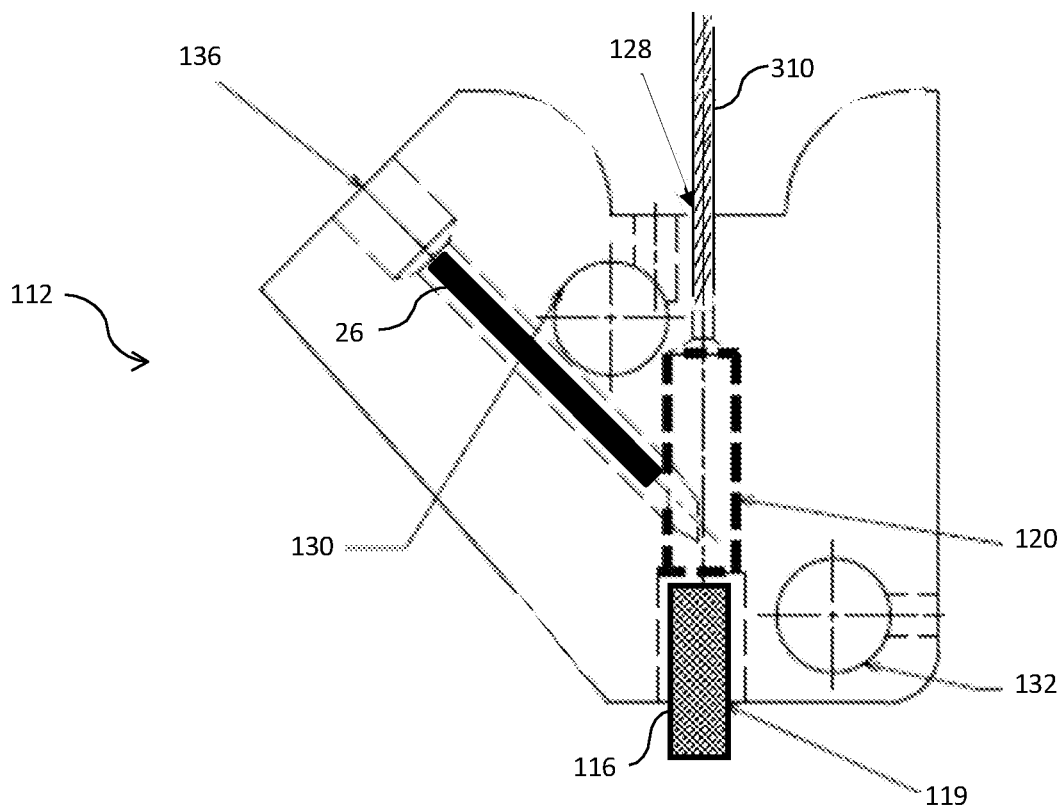
FIG. 6 illustrates aspects of an example print head that can be included in some implementations in accordance with example aspects of the present disclosure.
Figure 7:
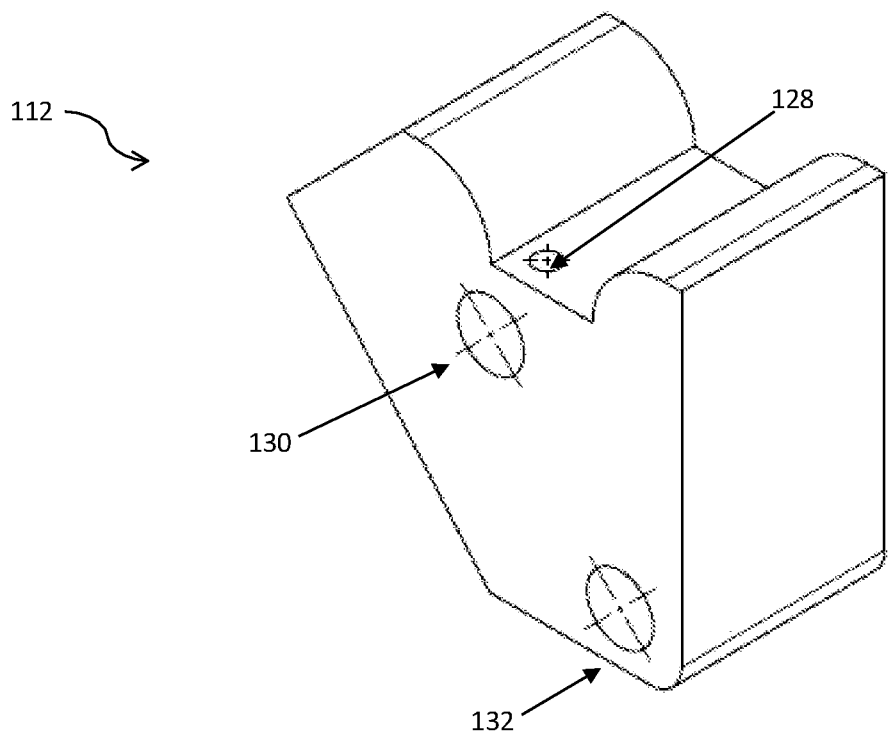
FIG. 7 illustrates a perspective view of FIG. 6.

FIG. 6 and FIG. 7 illustrate one embodiment of a print head 112 for use in a system as disclosed herein that can liquefy the polymers and combine a composite fiber 310 and a formation material 26 to form a composite material 16. As shown, the print head 112 includes an inlet 128 for a composite fiber 310 and an inlet 136 for a formation material 26. The formation material inlet 136 can be angled with respect to the composite fiber inlet 128; for instance, with an angle between the two of from about 20° to about 80°. The print head 112 can include a melt chamber 120 within which a composite fiber 310, fed through the composite fiber inlet 128, can be combined with the formation material 26, fed through the formation material inlet 136. The size of the print head 112, including the melt chamber 120, can be such that the print head includes an extended melt zone as compared to previously known print heads designed for fused filament formation techniques.

The relative rates of addition of the formation material 26 to the composite fiber 310 can vary. For instance, the formation material 26 can be combined with the composite fiber 310 within the melt chamber 120 and the flow rate of the formation material 26 through the inlet 136 can be somewhat less than the flow rate of the composite fiber 310 through the inlet 128. In one embodiment, the flow rate of the formation material 26 through the print head 112 can be about 75% or less of the flow rate of the composite fiber 310 through the print heat 112. In some embodiments, the flow rate of the formation material 26 through the print head 112 can be from about 20% to about 60%, or from about 22% to about 32%, of the flow rate of the composite fiber 310 through the print head 112. Of course, flow rates of materials are not limited to this range, and in some embodiments, it may be beneficial to feed a formation material at a higher or lower feed rate as compared to the feed rate of the composite fiber 310. For instance, it may be preferred to feed the formation material through the print head at a higher flow rate than the composite fiber 310 in some embodiments.

It may be beneficial in some embodiments to monitor the feed rate of the components, particularly of the composite fiber 310, as well as to incorporate a tension control in the system, to avoid fiber breakage. For instance, a system can incorporate a feed rate feedback system that can provide for tension control of the composite fiber tension.

To improve deposition, the various materials can be preheated prior to deposition. For instance, and as illustrated in FIG. 6 and FIG. 7, a print head 112 can include a first heater at an insert 130 that can be utilized for heating a formation material 26 fed through the inlet 136 and a composite fiber 310 fed through the inlet 128 prior to their combination in the melt chamber 120. The print head 112 can optionally include a second heater at an insert 132 that can heat the combined composite material 16. The first and second heaters can be held at temperatures that are the same or different from one another. In one embodiment, the second heater at 132 can be at a lower temperature than the first heater at 130. The nozzle 119 can be heated to a nozzle temperature, either via the second heater at 132 or via a separate heating system for the nozzle, as desired.

In one embodiment, the formation material 26, the composite fiber 310, and/or the composite material 16 can be preheated within the print head 112 or upstream of the print head and prior to deposition by use of one or more heaters to a temperature of about 360° C. or greater; for instance, from about 360° C. to about 420° C. in some embodiments. Optionally, the nozzle 119 of the print head 112 can be heated to a similar temperature, e.g., about 360° C. or greater; for instance, from about 360° C. to about 420° C. in some embodiments. The various heaters can thus provide a print temperature envelope of from about 360° C. to about 420° C.

Discharge of the composite material 16 from a print head 112 can be achieved in different manners, depending on the application. In one embodiment, the composite fiber 310 may be advanced through the print head 112 as part of an extrusion process, whereby the composite fiber 310 is "pushed" or urged through the print head 112. In this embodiment, the composite fiber 310 is engaged with a driving system, such as a motorized friction drive wheel(s) or a forced air system, to advance the composite fiber 310 through the print head 112. For instance, a composite fiber 310 can enter the inlet 128 in the print head 112 and can be advanced toward the extrusion tip of the nozzle 119. The formation material 26 can be heated above the softening or melting temperature of the formation material 26, and the composite fiber 310 can be heated above the melting temperature of the polymer therein to soften and/or liquefy so as to combine the two in the melt chamber 120 and thence pass through the nozzle 119. The composite material 16 can thus be advanced from the print head 112 and onto a printing surface, a mandrel, and/or an existing work piece on a print bed. By movement of the print head 112 and the printing surface relative to one another, structures can be formed by additive application of the composite material 16 onto the printing surface, mandrel, and/or existing work piece.

As an alternative to advancing the composite fiber 310 by push or urging through the print head, the composite fiber 310 and formation material may be advanced by a pultrusion operation, whereby the composite material is drawn or pulled from the tip of the nozzle. In this embodiment, the contact point of the composite material on the printing surface of the print bed, a mandrel located on the printing surface and/or an existing work piece located on the printing surface can create an anchor (e.g., a fixed, contact, gripping point, and the like) that allows for the composite material to be pulled from the print head as the printing surface is moved relative to the print head.

Referring again to FIG. 5, drawing or "casting on" of the composite material 16 onto the printing surface 22, mandrel, and/or existing work piece to begin the printing process can be accomplished by various methods. For example, the composite material 16 can be connected or adhered to a needle or other type structure that can draw the composite material 16 from the print head and apply it to the printing surface 22, mandrel, and/or existing work piece. As an alternative, the nozzle 19 of the print head 12 may be brought into contact with the printing surface 22, the mandrel, and/or the existing work piece so as to contact the composite material 16, whereby the composite material 16 (e.g., the formation material 26 encompassed in the composite material 16) can adhere to the printing surface 22, mandrel, and/or the existing work piece creating an anchor for pulling the composite material 16 from the print head 12.

The rate of advancement of the composite material 16 through the print head 12, the temperature of the formation material 26, the polymer of the composite fiber 310, and/or in some instances, the temperature of the printing surface 22, the mandrel, and/or the existing work piece on the print bed require some level of control to ensure that the composite material 16 is applied in a manner to provide desired adherence. For example, the temperature of the formation material 26 and the composite fiber 310, and the rate of movement of the print bed and/or mandrel may be controlled to ensure that the composite material 16 is applied in a manner to allow for proper adherence of the composite material 16 to the printing surface 22, mandrel, and/or existing work piece. In some instances, the printing surface and/or the mandrel and/or the existing work piece on which the composite material 16 is applied can also or alternatively be temperature controlled for this purpose. In general, the rate of combination and temperature of the formation material 26 on the composite fiber 310 are controlled to ensure that the formation material 26 is combined in a desired manner with the composite fiber 310 and that the composite material 16 is drawn from the print head 12 in a consistent manner. By way of example, a print speed for deposition of a composite material 16 onto a surface can be about 5 mm/sec or more, about 20 mm/sec or more, or about 50 mm/sec or more, in some embodiments.

Tensioning of the composite material 16 may also be required for proper advancement onto the printing surface, mandrel, and/or existing work piece. Tensioning systems can take many forms and can be located at different positions in the process to provide proper tensioning of the composite fiber 310 and/or the composite material 26. For example, a spool maintaining the composite fiber 310 can be fitted on a tensioning system, such as a rotational break or clutch, that impedes rotation of the spool as composite fiber 310 is meted from the spool to provide tensioning. Similarly, the print head 12 may include a tensioning system, such as restrictive pulleys, clutch, friction element or the like to apply tension to the composite material 16.

It is also contemplated that certain print systems can be equipped to perform both "push" and "pull" of the composite material 16 to advance the composite fiber 310 through the print head 12. In this embodiment, there may be drive means associated with the print head 12 to advance the composite material 16 through the print head assisted by a pulling effect of the movement of the print bed, mandrel, and/or existing work piece on the composite material as it is advanced.

As mentioned above, the composite material 16 may be applied to a mandrel, where the mandrel operates as a form, support, and/or pattern of the work piece to be manufactured from the composite material 16. The mandrel aids in shaping of the work piece being printed as the composite material 16 is applied to the mandrel. After printing is complete, and the printed work piece has at least partially cured, the mandrel can be removed from the work piece, such as by eroding, dissolving, breakings, shrinking, or other contemplated procedures for removing either portions of or the entire mandrel.

According to one embodiment, a structure that incorporates the composite fiber 310 can be formed by use of a 3D printer that utilizes a six (6) degrees of freedom (or more, including seven degrees of freedom) system that allows the printing of composite material in different directions and orientations relative to a plane perpendicular of a print bed. The term "6 degrees of freedom" refers to the freedom of movement in 3D space of the print bed onto which the fiber is printed. Specifically, the print bed has six (6) independently controllable movements: three translational movements and three rotational movements. The translational movements are up/down, left/right, and forward/backward, and the three rotational movements are typically referred to as pitch, roll, and yaw. The print head may be fixed relative to some degrees of freedom, such as up/down, or alternatively, may also exhibit six degrees of freedom. In some embodiments, added degrees of freedom can be achieved by the introduction of a mandrel on the print bed to which composite material is applied. Orientation of the mandrel itself may be controlled relative to the print bed to provide added degrees of freedom (e.g., 7 degrees of freedom).

For example, composite material 16 could be applied as the print bed is periodically or continuously altered in direction/orientation to create a complex pattern of composite material 16, such as, for example, a zigzag pattern in the work piece or a bend or complex shape in the work piece that cannot be achieved by linear application of material. The composite material 16 may even be twisted about itself by manipulation of the print bed and/or an alternative mandrel relative to the composite material 16 during application.

Figure 8A:
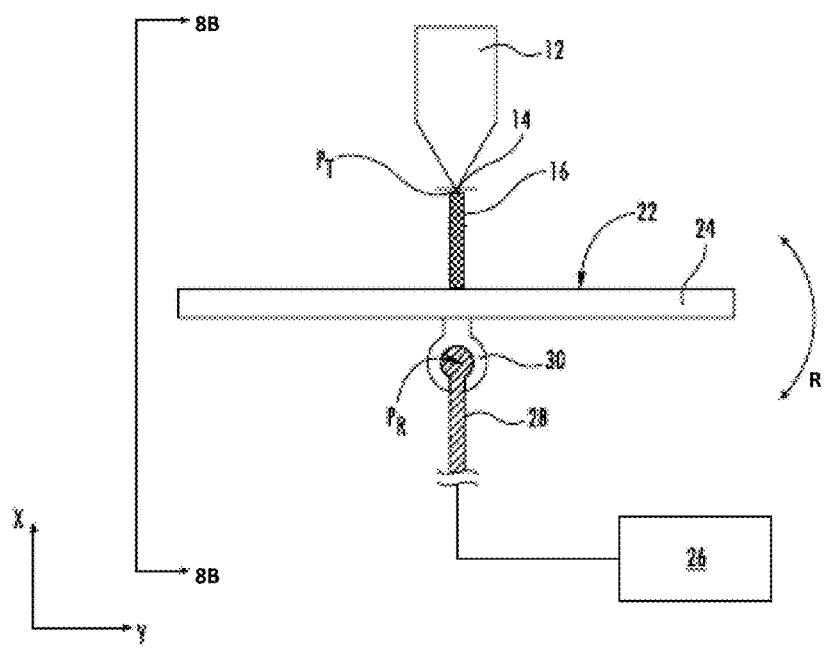
FIG. 8A illustrates aspects of an example additive manufacturing system that can be included in some implementations in accordance with example aspects of the present disclosure.
Figure 8B:
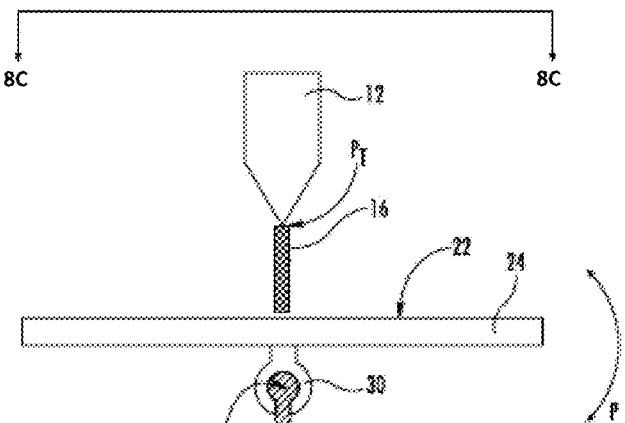
FIG. 8B illustrates a side view of the exemplary system of FIG. 8A.
Figure 8C:
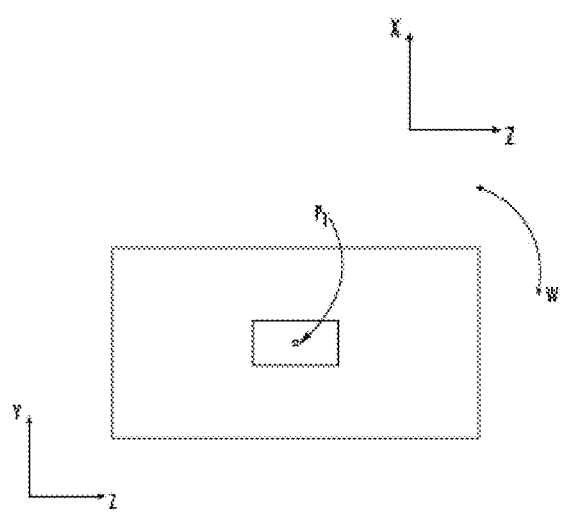
FIG. 8C illustrates a top view of the exemplary system of FIG. 8A.

FIGS. 8A, 8B, and 8C illustrate diagrams of an exemplary print system, including a nozzle 12 having an extrusion tip 14 defining a translational point PT. The nozzle 12 combines a formation material 26 and a composite fiber 310 to form a composite material 16 as described above and as illustrated in FIG. 5. During printing, the composite material 16 is deposited onto the printing surface 22 of the print bed 24 and/or a mandrel (not shown) located on the printing surface. The print bed 24 can be configured to move independently in at least 6 degrees of freedom, as controlled by the controller 26.

For instance, the print bed 24 can be moveable in one or more of the x-direction (i.e., up/down with respect to the translational point $P_T$), the y-direction (i.e., laterally with respect to the translational point $P_T$), and the z-direction (i.e., cross-laterally with respect to the translational point $P_T$). The print bed 24 can be moved translationally, independently, by a controller 26 using an arm 28 in communication with a ball and socket connection 30 of the print bed 24. In particular embodiments, the arm 28 can be formed from multiple segments connected together at moveable joints (bending and/or rotating) to allow for translational movement of the print bed 24 with respect to the translation point $P_T$.

Additionally, or alternatively, the print bed 24 can be rotationally movable about the rotational point PR to provide rotational movement along one or more of the roll (r), pitch (p), and yaw (w) rotation axes. The print bed 24 can be rotated in any direction, independently, by a controller 26 using the arm 28 in communication with a ball and socket connection 30 of the print bed 24. Although shown as utilizing a ball and socket connection 30, implementations according to the present disclosure can use any suitable connection for producing rotational movement.

In one embodiment, the controller 26 may comprise a computer or other suitable processing unit. Thus, in several embodiments, the controller 26 may include suitable computer-readable instructions that, when implemented, configure the controller 26 to perform various different functions, such as receiving, transmitting, and/or executing arm movement control signals.

A computer generally includes a processor(s) and a memory. The processor(s) can be any known processing device. Memory can include any suitable computer-readable medium or media, including, but not limited to, RAM, ROM, hard drives, flash drives, or other memory devices. The memory can be non-transitory. Memory stores information accessible by the processor(s), including instructions that can be executed by the processor(s). The instructions can be any set of instructions that, when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry including, but not limited to, application-specific circuits. Memory can also include data that may be retrieved, manipulated, or stored by processor(s).

The computing device can include a network interface for accessing information over a network. The network can include a combination of networks, such as a Wi-Fi network, LAN, WAN, the Internet, cellular network, and/or other suitable network, and can include any number of wired or wireless communication links. For instance, the computing device could communicate through a wired or wireless network with the arm 28, the ball and socket connection 30, and/or the nozzle 12.

In one particular embodiment, the controller 26 can include (or be in communication with a computer that includes) supporting software programs that can include, for example, computer aided design (CAD) software and additive manufacturing layering software as are known in the art. The controller 26 can operate via the software to create a 3D drawing of a desired structure and/or to convert the drawing into multiple elevation layer data. For instance, the design of a 3D structure can be provided to the computer utilizing commercially available CAD software. The structure design can then be sectioned into multiple layers by commercially available layering software. Each layer can have a unique shape and dimension. The layers, following formation, can reproduce the complete shape of the desired structure.

For example, the printer can be accompanied with software to slice beyond the current xyz slicing methodology used in industry. For example, 3D objects other than 3D Cartesian objects, such as an iso-parametric helically-/spirally-winded band around a duct, can be spirally sliced instead of sliced in a flat plane to be able to spirally lay down/print filament and/or slit tape/tow. Thus, the iso-parametrical slicing can be utilized with printing capability of the 6 degrees of freedom.

Numerous software programs have become available that are capable of performing the functions. For example, AutoLISP® can be used in a slicing operation as is known in the art to convert AutoCAD® STL files into multiple layers of specific patterns/toolpaths and dimensions. CGI (Capture Geometry Inside, Minneapolis, Minn.) can also provide capabilities of digitizing complete geometry of a 3D object and creating multiple-layer data files. The controller 26 can be electronically linked to mechanical drive means so as to actuate the mechanical drive means in response to x-, y-, and z-axis drive signals and p, r, and w rotation signals, respectively, for each layer as received from the controller 26.

A system can include additional components as are generally known in the art that can aid in the deposition process. For instance, a system can include an accelerometer that can monitor the load on the composite fiber and/or the composite material for break of the fiber during deposition. In one embodiment, a system can include auditory capability, for instance a directed microphone that can detect scraping of the composite fiber within the print head, which can detect warping and/or high tension of the fiber. A print head can be utilized in conjunction with laser devices or thermal imaging cameras that can provide data with regard to the printing process, e.g., print height, cooling rate of deposited materials, etc.; a 3D scanner for real time verification of deposited geometry, etc. In addition, a system can include an active cooling mechanism for cooling the deposited material.

The present disclosure may be better understood with reference to the example, set forth below.

Example

This example discusses an example implementation of composite fiber manufacture using in-line polymerization that may be understood in conjunction with the Figures and Description provided herein. The materials and arrangements described in the example are demonstrative and are not meant to constrain the scope of the disclosure only to the materials and arrangements used.

Figure 9:
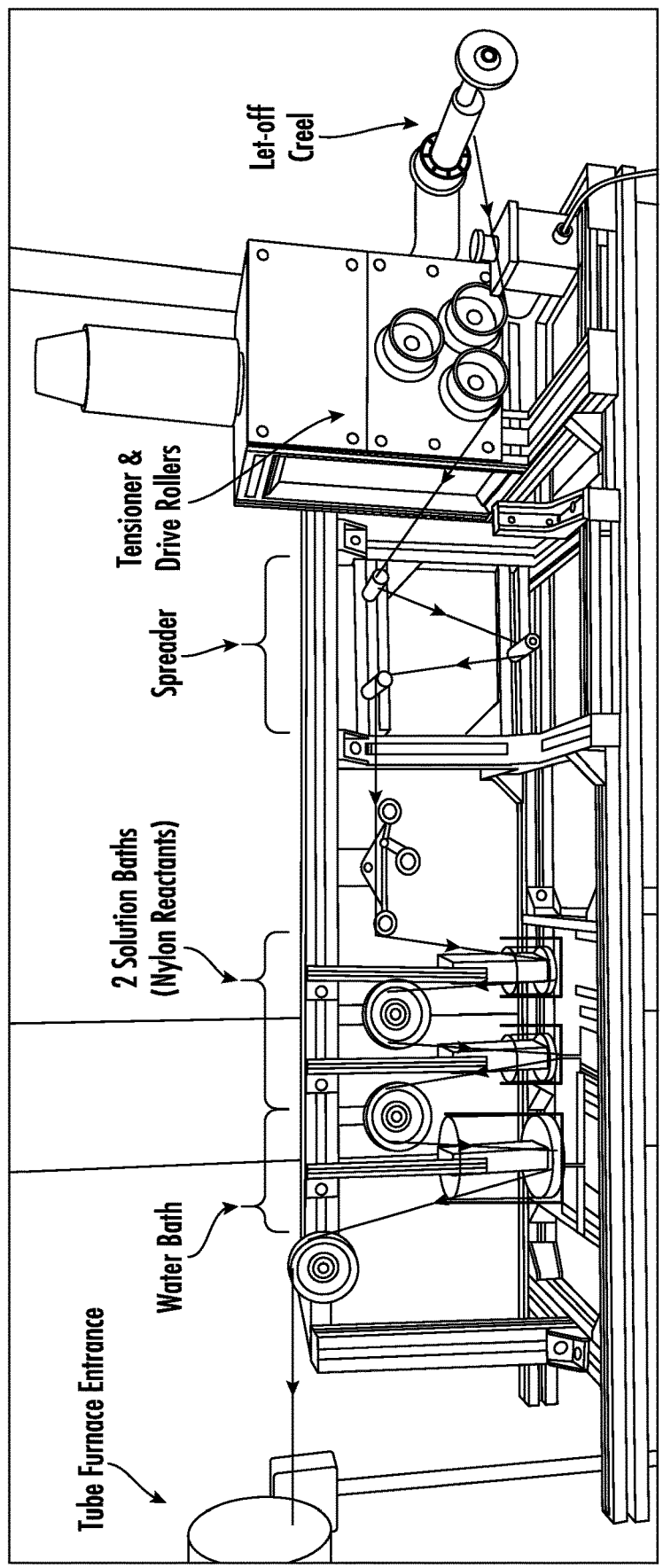
FIG. 9 provides a photograph of an example implementation in accordance with example aspects of the present disclosure.

FIG. 9 provides a photograph an example infiltration system. As shown, the example infiltration system includes a let-off Creel that includes a reel of the continuous fiber. As the continuous fiber is moved from the let-off Creel along the fiber pathway, as indicated by the arrows, the continuous fiber can contact a series of at least two solutions baths (e.g., a first solution and a second solution) that can include polymerization reactants for producing a polymer (e.g., nylon reactants for producing nylon). An example infiltration system, as illustrated, can also include components such as a tensioner and/or drive roller(s) for maintaining a certain tension on the continuous fiber (e.g., a taut tension or a loose tension). Example systems can also include a spreader. The spreader can be used to spread filaments of a continuous fiber (e.g., a roving) into a wider form such as a tape. Additional components of the example system can include a wash bath (e.g., a water bath) and a heater (e.g., tube furnace).

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged in whole or in part. Furthermore, those of ordinary skill in the art will appreciate that the foregoing description is by way of example only and is not intended to limit the invention so further described in the appended claims.

What is claimed:

1. A method for forming a composite fiber for an additive manufacturing device, the method comprising:
generating an infiltrated fiber by immersing a first region of a continuous fiber in a first solution included in a series of two or more solutions each provided with a respective roller directing movement of the continuous fiber in or past the solutions, wherein the first solution comprises a first monomer, a first catalyst, or both;
immersing the infiltrated fiber in a second solution included in the series of two or more solutions to generate a first polymer in and/or on the first region of the continuous fiber, wherein the first polymer incorporates the first monomer, and wherein the second solution comprises a second monomer, a second catalyst, or both;
adjusting a position of the rollers to immerse a second region of the continuous fiber in a third solution included in the series of two or more solutions, wherein at least a portion of the second region is different from the first region and at least a portion of the first region is not immersed in the third solution;

washing at least the first region of the continuous fiber with a solvent to produce a wet composite fiber; and
removing the solvent from the wet composite fiber.

2. The method of claim 1, wherein the first monomer comprises caprolactam, adipoyl chloride, hexamethylene diamine, or adipic acid.

3. The method of claim 1, wherein the continuous fiber is pulled through the first solution.

4. The method of claim 1, further comprising:
providing the composite fiber to an additive manufacturing device;
heating the composite fiber to a deposition temperature; and
depositing the composite fiber on a print area.

5. The method of claim 1, wherein the first polymer comprises nylon 6 or nylon 6,6.

6. The method of claim 1, wherein the third solution comprises a third monomer, and wherein at least a portion of the second region of the continuous fiber includes the first region of the continuous fiber.

7. The method of claim 6, further comprising: generating a second polymer in and/or on the second region of the continuous fiber, wherein the second polymer incorporates the third monomer.

8. The method of claim 7, wherein generating the second polymer in and/or on the second region of the continuous fiber comprises:
after immersing the second region of the continuous fiber in the third solution, immersing the second region of the continuous fiber in a fourth solution of the series of two or more solutions.

9. The method of claim 1, further comprising molding the composite fiber.

10. The method of claim 1, wherein the continuous fiber is a fiber roving.

11. The method of claim 10, wherein the fiber roving comprises from about 1,100 to about 50,000 individual filaments.

12. The method of claim 1, wherein the first solution comprises the first monomer, wherein the second solution comprises the second monomer, wherein the first monomer is hexamethylene diamine, and wherein the second monomer is adipic acid or adipoyl chloride.

13. The method of claim 1, wherein the continuous fiber comprises carbon fiber, glass fiber, or an organic fiber.

14. A system for printing a three-dimensional object, the system comprising:
a print head configured to receive a composite fiber;
an infiltration system for generating the composite fiber from a continuous fiber; and
a print bed comprising a printing surface onto which the composite fiber may be selectively applied by the print head to form a work piece,
wherein the infiltration system comprises a series of two or more solution baths each provided with a respective roller directing movement of the continuous fiber in or past the solution baths, wherein a position of the rollers is configured to be adjusted to immerse first and second regions of the continuous fiber in the solution baths such that at least a portion of the second region is different from the first region and such that at least a portion of the first region is not immersed in a respective one of the solution baths into which the second region is immersed.

15. The system according to claim 14, further comprising:
a drive means associated with the print head for advancing the composite fiber through the print head for application to the print bed with a formation material.

16. The system according to claim 14, wherein the composite fiber is advanced through the print head by pulling of the composite fiber via a connection of the composite fiber with one or more of a printing surface of the print bed, a mandrel, and/or an existing work piece.

17. The system according to claim 14, wherein the print bed is configured to move in at least six different degrees of freedom, and said system further comprises:
one or more drive means connected to the print bed for movement of the print bed in one or more of the six different degrees of freedom; and
a controller in communication with said one or more dive means.

18. The system according to claim 14, wherein the series of two or more solution baths each comprise one or more monomers for generating a first polymer; and
wherein the infiltration system further comprises a rinse bath, wherein the rollers are configured to move the continuous fiber through the series of two or more solution baths to generate the first polymer, and wherein the rinse bath includes a wash for removing unreacted monomers of the one or more monomers from the continuous fiber.

19. The system according to claim 18, the infiltration system further comprising:
a mechanism for directing the first and second regions of the continuous fiber to independently enter selected ones of the solution baths included in the series of two or more solution baths.

20. The system according to claim 18, wherein the one or more monomers comprise at least one of caprolactam, adipoyl chloride, hexamethylene diamine, adipic acid, or combinations thereof.

21. The system according to claim 14, wherein the viscosity of each solution bath of the two or more solution baths is from about 0.3 cP to less than 4.0 cP.

22. The system according to claim 14, further comprising:
at least one mandrel located on the print bed for receiving the composite fiber and providing a form for shaping of the composite fiber into a selected shape.

23. The system according to claim 22, wherein the mandrel has at least one degree of freedom independent of the print bed.

* * * * *